(12) United States Patent
Phatak

(10) Patent No.: US 9,246,691 B2
(45) Date of Patent: Jan. 26, 2016

(54) SYSTEM, METHOD AND APPARATA FOR SECURE COMMUNICATIONS USING AN ELECTRICAL GRID NETWORK

(71) Applicant: Dhananjay S. Phatak, Ellicott City, MD (US)

(72) Inventor: Dhananjay S. Phatak, Ellicott City, MD (US)

(*) Notice: Subject to any disclaimer, the term of this patent is extended or adjusted under 35 U.S.C. 154(b) by 0 days.

(21) Appl. No.: 14/539,359

(22) Filed: Nov. 12, 2014

(65) Prior Publication Data

US 2015/0378382 A1    Dec. 31, 2015

Related U.S. Application Data

(63) Continuation of application No. 14/134,471, filed on Dec. 19, 2013, now Pat. No. 8,918,639, which is a continuation of application No. 12/790,285, filed on May 28, 2010, now Pat. No. 8,639,922.

(60) Provisional application No. 61/312,468, filed on Mar. 10, 2010, provisional application No. 61/182,796, filed on Jun. 1, 2009.

(51) Int. Cl.
  *H04L 29/06*   (2006.01)
  *H04L 9/32*    (2006.01)

(52) U.S. Cl.
  CPC .................... *H04L 9/3271* (2013.01)

(58) Field of Classification Search
  CPC .................................................. H04L 9/3271
  USPC .......................................................... 713/156
  See application file for complete search history.

(56) References Cited

U.S. PATENT DOCUMENTS

| | | | |
|---|---|---|---|
| 5,153,918 A | 10/1992 | Tuai |
| 5,881,234 A | 3/1999 | Schwob |
| 5,915,001 A | 6/1999 | Uppaluru |
| 6,012,144 A | 1/2000 | Pickett |
| 6,016,476 A | 1/2000 | Maes et al. |
| 6,088,431 A | 7/2000 | LaDue |
| 6,088,683 A | 7/2000 | Jalili |
| 6,100,816 A | 8/2000 | Moore |

(Continued)

OTHER PUBLICATIONS

Phatak; "SMartER Power Grid Viewgraphs", Sep. 12, 2012, pp. 1-16.

(Continued)

*Primary Examiner* — Peter Shaw
(74) *Attorney, Agent, or Firm* — Whitham Curtis Christofferson & Cook, PC

(57) ABSTRACT

A secure communications and location authorization system using a power line or a potion thereof as a side-channel that mitigates man-in-the-middle attacks on communications networks and devices connected to those networks. The system includes a power grid server associated with a substation, or curb-side distribution structure such as a transformer, an electric meter associated with a structure having electric service and able to communicate with the power grid server, a human authorization detector input device connected to the electric meter and the power grid server. The human authorization detector is able to receive an input from a user physically located at the structure and capable of communicating with the power grid server via the electric meter. The user's physical input into the device causing a request to be sent to the power grid server that then generates a location certificate for the user. Without the location certificate, access to the communications network and devices connected to those networks can be denied.

26 Claims, 5 Drawing Sheets

(56) References Cited

U.S. PATENT DOCUMENTS

| | | | |
|---|---|---|---|
| 6,219,793 | B1 | 4/2001 | Li et al. |
| 6,249,865 | B1 | 6/2001 | Walker et al. |
| 6,831,551 | B2 | 12/2004 | Davenport et al. |
| 6,885,674 | B2 | 4/2005 | Hunt et al. |
| 6,934,858 | B2 | 8/2005 | Woodhill |
| 7,173,935 | B2 | 2/2007 | Lou et al. |
| 7,349,325 | B2 | 3/2008 | Trzeciak et al. |
| 2003/0151491 | A1 | 8/2003 | Martin et al. |
| 2003/0167178 | A1 | 9/2003 | Jarman et al. |
| 2004/0030935 | A1 | 2/2004 | Kai |
| 2005/0005150 | A1 | 1/2005 | Ballard |
| 2006/0038662 | A1 | 2/2006 | White et al. |
| 2008/0150753 | A1* | 6/2008 | Rudolf .................. G01D 4/004 340/870.03 |
| 2009/0203355 | A1* | 8/2009 | Clark ..................... G06F 21/32 455/411 |
| 2010/0328074 | A1 | 12/2010 | Johnson et al. |
| 2011/0093396 | A1 | 4/2011 | Parkos et al. |

OTHER PUBLICATIONS

Sherman et al.; "Location Authentication, Tracking and Emergency Signaling Through Power Line Communication: Designs and Protocols for New Out-of-Band Strategies"; Cryptologia, vol. 36, No. 2, 2012, pp. 129-148.

Author Unknown; "Out of Band Authentication Employing Existing Infrastructures"; 2008, Authentify, Inc., Chicago, IL, pp. 1-10.

Anderson; "Security Engineering: A Guide to Building Dependable Distributed Systems"; 2nd Edition, 2008, Wiley Publishing, Inc.; pp. ix-xxiv.

Author Unknown, "The Power Behind RSA SecurID® Two-Factor User Authentication: RSA ACE/Server," Solution White Paper, 2001, pp. 1-9, RSA Security Inc., Bedford, MA, USA.

Author Unknown, "YubiKey Brings Secure Login to Everyone," 2010, 1 p., Yubico, Inc., Sunnyvale, CA, USA.

Author Unknown, "Remedies for Phishing, Spyware, Malware and Keyloggers for Online Banking/Financial Service Providers and Merchants," 2004, pp. 1-5, StrikeForce Technologies, Edison, NJ, USA.

Dispensa, "Tokenless Two-Factor Authentication: It Finally Adds Up," 2008, pp. 1-11, Phonefactor, Inc., Overland Park, KS, USA.

Denning, et al., "Location-Based Authentication: Grounding Cyberspace for Better Security," Computer Fraud and Security, 1996, pp. 12-16, Elsevier, Maryland Heights, MO, USA.

Brands, et al., "Distance-Bounding Protocols," Advances in Cryptology, 1998, pp. 344-359, Springer-Verlag, Berlin, Germany.

Gonzales-Tablas, et al., "Survey on Location Authentication Protocols and Spatial-Temporal Attestation Services," Embedded and Ubiquitous Computing: Proceedings of the EUC 2005 Workshops, 2005, pp. 797-806, Springer, New York, NY, USA.

Kindberg, et al., "Context Authentication Using Constrained Channels," Proceedings of the 4th IEEE Workshop—Mobile Computing Systems and Applications, 2002, 8 pp., IEEE, New York, NY, USA.

Capkun, et al., "Secure Positioning in Wireless Networks," IEEE Journal on Selected Areas in Communications, 2006, pp. 221-232, vol. 24, No. 2, IEEE, New York, NY, USA.

Broadbridge, "Power Line Modems and Networks," Second IEEE National Conference on Telecommunications, 1989, pp. 294-296, IEEE, New York, NY, USA.

Pavlidou, et al., "Power Line Communications: State of the Art and Future Trends," IEEE Communications Magazine, 2003, pp. 34-40, vol. 41, No. 4, IEEE, Piscataway, NJ, USA.

Bumiller, et al., "Secure and Reliable Wide-Area Power-Line Communication for Soft-Real-Time Applications Within REMPLI," Ninth International Symposium on Power Line Communications and Its Applications, 2005, pp. 57-60, IEEE, New York, NY, USA.

Anatory, et al., "Trends in Telecommunication Services Provision: Powerline Network Can Provide Alternative for Access in Developing Countries," Seventh AFRICON, 2004, pp. 601-606, IEEE, New York, NY, USA.

Chong, et al., "Solutions for the 'Silent Node' Problem in Automatic Meter Reading System Using Powerline Communications," Seventh International Power Engineering Conference, 2005, pp. 1-6, IPEC.

Pacheco, et al., "A Power Line Communication Stack for Metering, SCADA and Large-Scale Domestic Applications," Ninth International Symposium on Power Line Communications and Its Applications, 2005, pp. 61-65, IEEE, New York, NY, USA.

Treytl, et al., "Real-Time Energy Management Over Power-Lines and Internet," Proceedings of the Eighth International Symposium on Power-Line Communications and Its Applications, 2004, 6 pp., IEEE, New York, NY, USA.

Author Unkown, "IEEE Standard for Broadband Over Power Line Hardware," IEEE STD 1675-2008, 2009, pp. i-ix and 1-35, IEEE, New York, NY, USA.

Treytl, et al., "Practical Issues on Key Distribution in Power Line Networks," Tenth IEEE Conference on Emerging Technologies and Factory Automation, 2005, pp. 83-90, vol. 2, IEEE, New York, NY. USA.

Bellare, et al., "Keying Hash Functions for Message Authentication," Advances in Cryptolog—CRYPTO '96, edited by Neal Koblitz, Lecture Notes in Computer Science, 1996 pp. 1-19, vol. 1109, Springer-Verlag, Berlin, Germany.

Author Unknown, "HomePlug AV White Paper," 2005, pp. 1-11, HomePlug Powerline Alliance, Inc., Portland, OR, USA.

Author Unknown, "The Legion of Bouncy Castle Java Cryptography APIs," accessed on Nov. 4, 2010, 2 pp., BouncyCastle.org.

Sherman, et al., "Location Authentication through Power Line Communication: Design, Protocol, and Analysis of a New Out-of-Band Strategy," Power Line Communications and Its Applications (ISPLC), 2010 IEEE International Symposium, 2010, pp. 279-284, IEEE, New York, NY, USA.

\* cited by examiner

SYSTEM, METHOD AND APPARATA FOR SECURE COMMUNICATIONS USING AN ELECTRICAL GRID NETWORK

CROSS-REFERENCE TO RELATED APPLICATIONS

The present application is a continuation application of U.S. patent application Ser. No. 14/134,471 filed Dec. 19, 2013, now U.S. Pat. No. 8,918,639, which was a continuation application of U.S. patent application Ser. No. 12/790,285 filed May 28, 2010, now U.S. Pat. No. 8,639,922. The present application claims the benefit of earlier filed U.S. Provisional Patent Applications No. 61/182,796, filed Jun. 1, 2009, and No. 61/312,468, filed Mar. 10, 2010, the contents of each of which are incorporated in their entirety herein.

BACKGROUND OF THE INVENTION

1. Field of Invention

The present invention relates generally to using a portion of an electrical power grid network as an out-of-band or side-channel to enhance the security of various tasks, including, but not limited to, multifactor-authentication schemes, Strong and tamper-proof location binding and certification, securing transactions over a separate network (such as the Internet), tracking the location of electronic devices connected to the electrical grid, and authenticating the location of a person or device communicating with or attached to the separate network as well as to disseminate information via as many paths as possible in case of an emergency

2. Description of the Related Art

Time and again, experience has shown that network security is often an afterthought in designing network communications systems. This is true of the Internet, where the designers and architects of the Internet infrastructure and protocols did not consider that their creation would become the communication backbone of the world, and that it would end up transmitting and distributing nearly all types of communications, including voice, video, and data. As a result, security was not a consideration, until very recently. Today, there is a set of protocols for securing communications made using the Internet, but they are vulnerable.

Similarly, with the rapid growth in technologies and use of computers, those who sold such devices could never have thought that computing would become so ubiquitous and that their products—the personal computers and related operating systems that run them—would gradually become the "base platform" underlying increasingly larger numbers of systems. Consequently, security was never the main consideration in designing either the processors or the operating systems. Consequently, the most vulnerable components in communications networks are often the end-users' computers themselves.

To address these shortcomings, computer users are often forced to subscribe to anti-virus software services or purchase anti-virus software applications to track viruses and other software that act upon their computer systems. Some of the same vendor software used by end-users, however, include root-kits and other malware to, for example, monitor user's violations of license conditions. Thus, other than the most experienced computer and network security experts, most end users cannot be certain that their own computers have not been compromised after they have been in-operation for any period of time (even as short as a week).

Notwithstanding those vulnerabilities, people use their personal computers at their homes or other locations to remotely log into their banks and other personal accounts without a second thought as to security concerns, assuming, incorrectly, that there is "safety in numbers," and that, in terms of probabilities, they will never be individually targeted by crooks. Their justification is often that their personal communications are not that valuable, and if victims are selected randomly, the chance that they will be attacked is very small.

It is not surprising that a personal computer as well as the communications networks the computer operates on are highly vulnerable to subversion. In fall 2008, it was reported that French President Nicoli Sarkusi's personal bank account was remotely accessed by hackers based in Niger. More recently, it was widely reported that computers owned and operated by the two leading U.S. presidential candidates' campaigns were remotely scanned by computer systems reported to be based in China. It was also reported that the entire sub-networks connecting most of the personal computers in the Dalai Lama's organization, as well as the computers themselves, were compromised by others. More recently, it was reported that unauthorized entities gained access to networks controlling electrical grids and scanned and tested the extent to which access into the network could be achieved. In spring 2009, it was also reported that several sensitive design details of the U.S. Joint Strike Fighter (JSF) aircraft were stolen from computers of one of the U.S. government contractors involved in the JSF development by remote entities. Thus, computer and network security is widely recognized as a pressing issue and in need of better, stronger security mechanisms.

Security experts and cryptologists have designed ever-more sophisticated mechanisms to defend against a "Man-in-the-Middle" (MITM) attack (in a more general sense a "malicious middleware/middle-entities" or simply a "Malicious-Middle" (MM) attack). In the strictest theoretical sense, at least one out-of-band communication is necessary to guard against the aforementioned vulnerabilities and actual attacks. However, increasing the diversity of such communication paths is a good practical way to hedge against the risk of a MitM or MM attack.

Closely related to the security issue is the vital concept of "trust". Any infrastructure related to computer and network security must be backed up by a hierarchy of trusted entities. In the context of the Internet, this is achieved by creating and maintaining a "certification" infrastructure (which subsumes a PKI or "public-key-infrastructure"). However, it is known that certificate revocation and re-issuing processes have been exploited as vulnerabilities.

Current, state-of-the art security systems, apparata, and methods for securing communications or access to networks or remote computers typically deploy multifactor authentication. That is, such measures do not depend solely on signals transmitted via a single medium such as the Internet. Rather, they also use other independent communication paths to send a portion of the information being communicated (i.e., typically the authentication tokens during the initial phase of establishing a connection).

An example of this is the bank account-accessing procedure recently made available to the security-conscious users by some U.S. banks, such as Bank of America. A computer user seeking remote access to their bank account located on a bank server that is equipped with a security-enhanced protocol may be required to do two things. First, the user must follow the normal logon procedures, including confirming that a pre-determined image is displayed in the individual's browser as a minimalist defense against a "phishing" attack, and then enter the user's username/password and whatever else the bank might ask for. Second, in addition, the user may receive from the bank a random alphanumeric/ASCII character string via an alternate/side channel in the form of an SMS/text message sent to the user's mobile phone. The user must copy/enter that string in a password-like dialogue box on the user's computer browser within a certain (fairly short) time period. This random nonce serves as a "one-time authentication token". This way, even if the user's home computer is compromised and someone is running a keyboard-logger to capture their bank username, password, etc., the random string is different each time and the bank will recognize and deny attempts to reuse old text strings. If the cell phone is also lost/stolen, then gaining access to the user's bank account is possible, but now the attacker's job is harder. The attacker must compromise the user's personal computer and be in possession of the SMS text account or physically steal the user's mobile phone.

To authenticate users of applications accessed over the Internet, strong strategies often require each user to pass multiple independent authentication challenges. Such challenges might involve knowledge of passwords, possession of physical tokens, biometrics, control of second channels, and proofs of physical location. For example, it is believed that Authentify, Inc., sells an authentication service using telephone callback. For many applications, such a strategy meaningfully enhances authentication assurance by forcing the adversary to corrupt multiple independent systems.

As illustrated above, basic security measures must address (1) how to bootstrap the chain of trust among and between communications nodes in a communications network, and (2) how to facilitate and achieve at least one-single out-of-band communication to guarantee that the ensuing communications between nodes are free of the danger of MitM and/or MM attacks.

In general, a diversity of communication paths between communications nodes is the best hedge against malicious subversion attacks that compromise the communication between those nodes. As wireless networks and services continue their explosive growth, it is easy and natural to utilize wireless technologies to deploy out-of-band or side channels for security purposes (as evidenced by the bank-login-procedure mentioned above that uses text-messaging via cellphones as a side channel). However, while those wireless voice and data networks are continuing to be exploited, very little attention has been focused on using the existing electrical grid as the side channel (or as an additional side channel).

Other multi-factor authentication systems have also been well known for some time. For example, using a clock synchronized with an application server, an RSA SecurID hardware token generates a new one-time password every 60 seconds to be entered by the user. Dongles, such as ID2P Technologies' CFPKey and Yubico's YubiKey, generate cryptographic tokens to be sent by the user's computer to an Internet application. Many Internet applications use email as a simple out-of-band authentication channel: after entering a username and password, the user also enters a use-once randomly generated string sent to the user's email account. The companies Authentify, StrikeForce, and PhoneFactor perform a similar authentication service using telephony as the second channel. A variety of architectural choices are possible. With Authentify, one option is for the application to send the user's telephone number to the Authentify authentication service, which generates a random string and sends it both to the application and via telephone to the user, who then enters the string into the application. These products are vulnerable to a MitM attack carried out on a compromised user computer, and they do not bind a user to a location.

Several location authentication methods have been suggested using global positioning system (GPS), wireless, infrared, timing, or triangulation strategies. In 1998, Dennings and MacDoran proposed using a trusted GPS receiver to sign a location certificate. In 1993, Brands and Chaum described distance bounding protocols based on roundtrip time between prover and verifier, though this approach is vulnerable to collaborative attacks. Kindberg, Zhang, and Shankar offered a different distance-bounding protocol, based on token broadcast, but their approach is subject to a token-forging proxy attack. Capkun and Hubaux combine distance-bounding and triangulation strategies. For additional methods, see Ferreres et al.

Previous device tracking and anti-theft mechanisms have been developed by others. Anti-theft mechanism need to consider two important aspects: preserving confidentiality of stored data and locating stolen mobile device. Present anti-theft solutions provide strong mechanism to preserve the confidentiality of stored data. User authentication is the fundamental mechanism, which prevents unauthorized access to a stolen device. Remote Laptop Security (RLS) allows a user to control access to files on a computer even if it has been lost or stolen. RLS software encrypts all confidential files and access to files is allowed only after successful authentication. The owner of a stolen device can remotely issue data disable command through RLS whenever the stolen device gets connected to a central server through the Internet. Software based on user authentication and RLS scheme can be bypassed by, for example, reinstalling the operating system, and/or using password recovery software because the thief has complete control of the stolen device.

Prey, BackStopp, FailSafe, and GadgetTrak provide device tracking software to locate and help in the recovery of stolen devices. In their centralized approach, a client machine periodically contacts a central inventory server through the Internet. The location information of the device is determined based on an IP address. Apart from the Internet, the anti-theft software uses WiFi, GSM as the communication channel. The victim can trace the stolen device using location information reported at the central inventory server. The Internet-based location information is not fine-grained because it provides location at the edge of the router instead of the location of the actual stolen device. In such anti-theft mechanisms, location information can be forged using anonymous proxies, and using Tor. In addition, reinstalling the operating system makes software-based anti-theft solutions inept.

Computrace Lojack provides a BIOS-based anti-theft solution that is an extension to software-based device tracking mechanisms. Instead of a hard-drive, their anti-theft software is installed inside the BIOS. Therefore, removing the BIOS-based anti-theft mechanism is difficult, but not impossible.

Intel Centrino 2 with vPro provides hardware-based anti-theft solutions for laptops. Intel's anti-theft hardware preserves the confidentiality of stored data using Data-at-Rest (DAR) encryption technology. Also, it uses a centralized approach for tracing the location of a stolen device. At scheduled rendezvous, the hardware agent checks in with a monitoring center. On check in, the stolen device receives complete disable commands from the monitoring center, which makes the data and the laptop inaccessible to the thief. Intel's approach avoids reliance on the Internet connectivity by employing a hardware-based timer to periodically authenticate the identity of the user. Hardware-based user authentication is harder to bypass.

Moreover, reinstalling the operating system does not make a stolen laptop accessible to a thief, which is a significant advantage of Intel's anti-theft hardware solution.

Lojack, GPS tracking, Enfotrace provide GPS-based anti-theft mechanism. In their solutions, a radio transceiver is secretly installed inside the mobile device. A radio transceiver periodically reports the location of the mobile device to a central inventory server. These anti-theft mechanisms provide security by obscurity. A thief can easily bypass such mechanisms by simply removing the radio transceiver from the mobile device.

It is well known that the electric conductors in the electrical grid can be used for data communications (albeit over small distances and relatively smaller bandwidths). First demonstrated in 1940, communications over power lines are now used in many countries for Automatic Meter Reading (AMR), SCADA system control, and Internet service. Vendors such as Corinex, Cisco systems, Netgear, D-Link and others offer devices that can deliver an Ethernet-protocol network over the existing electric copper/aluminum wires from any residential power socket to any other residential power socket within a home or building using the HomePlug specification. This technology is now very mature, stable and is rapidly becoming widespread as evidenced by the recent incorporation (in 2009) of HomePlug technology as the baseline for a newly emerging IEEE P1901 powerline communication standard.

U.S. Pat. No. 6,831,551, discloses transmitting sensor data from railroad crossings via the power lines utilized to provide power to lamps located at the railroad crossings. It also discloses applications that require a group of loosely coupled transceivers to share a communication line. For example, a disclosed embodiment of the invention utilizes an electronic key where the power line is used to power a lock device as well as exchange user provided authentication code information with an authorization database. Another embodiment utilizes an automobile sensor and control where the sensors communicate with controllers over a battery bus. The patent also discloses residential uses, for example residential security such as infra red sensor monitoring and powering; and residential appliance automation where appliances are turned on or off via commands over the power line.

In the electronic key scenario, the patentee refers to, for example, a garage opener door opener or an electrically operated safe. The authentication code provided by the user is transmitted over the same power lines that power the device itself (i.e., the garage door or the electronic safe door) and is matched against a database. This does not involve using an independent physical path as a side channel as one component of a multifactor authentication scheme. In the automobile scenario, the patent teaches using the battery bus to transport signals within the automobile itself, not to a separate system. In the residential infrared sensor monitoring and powering scenario, and the scenario involving turning residential appliances on/off via commands sent over power lines, these systems appear to rely on the signals transferred via one single method (i.e., Internet only, wireless phone-only, electric-power-lines only).

Several vendors in different localities have been providing end-users with up to 10 Mbps connectivity to the Internet via electric power lines. For example, as indicated in an article published in October 2005, the city of Manassas, Va., began the first wide-scale deployment of Broadband over Power Lines (BPL) service in the U.S., offering 10 Mbits/sec service for under $30 USD per month to its 35,000 city residents, using MainNet BPL. It is therefore not surprising that the electric utilities have the capability to read the individual home-electric meters from the premises (substation/distribution-hub, etc.) and are increasingly deploying such technologies.

The use of the electrical grid poses a variety of challenges, including low network bandwidth, high signal attenuation and interference on low-voltage lines, silent nodes, transformers which obstruct signals, and a hierarchical structure comprising low-, medium-, and high-voltage lines. The REMPLI project proposed a generic architecture for distributed data acquisition and remote control, which can support applications including AMR and SCADA. Broadband services follow a similar approach. Treytl and Novak designed a key management architecture for REMPLI. In these architectures, each home electric meter communicates over power lines with its substation, which communicates with the electrical grid server using a separate private network such as GPRS, 3G, WiMax, WiFi, HFC.

The electrical power generation and distribution methods used today have not changed much since their inception. Power generation is done at a few or strategic locations (such as hydroelectric dams or fossil- or nuclear-fueled plants) that produce all the electricity, and the electrical grid simply distributes it to the end users. In the conventional electrical grid, the electric energy flows in only one direction: from the generation stations to the end-users. Furthermore, no mechanisms for large-scale storage of electricity are known or available. As a result, the amount of electricity produced must match the demand for its consumption. To their credit, the electrical generation utilities, for the most part, have been able to predict the demand (which can vary wildly) and meet it by appropriately "firing" (or bringing into service) as many generators as are needed. If the delicate balancing act of matching of generation with consumption is not continually done, there can be outages in the electrical grid.

The scarcity of resources and/or the need to reduce the impact of human activities on the environment (which is dictated by sustainability) is expected to force electrical producers and consumers to harness solar, wind, tidal, geo-thermal and other forms of energy. However, these sources of energy are inherently "distributed" and un-reliable in nature. They will complicate the process of matching generation with consumption. Moreover, the flow of electric energy will now be bidirectional. In an ideal scenario, the electrical grid itself should continuously sense the current demand for power and be able predict the demand some-time ahead (at least in the immediate future). Of course the sensing devices need to take into account the time of day (how bright is the sunlight), the season (winter/peak-summer or fall/spring) to try and predict the demand. In addition, such sensing devices must also sense the wind(s) and other local conditions in order to assess how much of the required power could be produced "locally". Smart sensors should then report back to the generation stations the difference (between demand and local supply capacity) so that the utilities can produce only what is needed.

The term "smart" in reference to smart electrical grids refers to such grids that can automatically balance the complex and dynamic factors such as distributed/local production of electricity, centralized large-scale production (using conventional generation-stations), vis-à-vis the total demand. Obviously the electrical grid would have to be smart to perpetually strike the delicate balance between supply and demand.

In the literature, the term "smart" has also been used to indicate grids that are resilient to attacks attempting to subvert their operations. The "security and reliability/availability" attributes that a "smart" grid must possess refer to the security of the grid itself.

Internet developers have been searching for stronger multifactor authentication schemes (which are in turn strengthened by diverse, independent communication paths). At the same time, there has been a misdirected use of the electrical grid's limited powerline communication capabilities. A great deal of "smart/good" electrical grid infrastructure is in place and is improving by the day. However, it is essential to recognize that power-lines were (and will always be) designed to carry electric-power efficiently, not to transmit communication signals. It is therefore futile for electrical utilities to offer broadband-data-connectivity across powerlines in an attempt to compete with cable/phone/connectivity-providers who are deploying optical fibers and other technologies that are specifically developed for high bandwidth/broadband communications. Also, almost all data/transaction servers at banks or other service providers are connected to some electrical grid. Indeed, it is unusual to encounter mobile servers powered by stand-alone power sources disconnected from the rest of the electrical grid.

Power companies can remotely read individual electric meters through powerline communications even today. In many instances, the utilities might not be using powerline communications. In some places they have created dedicated wireless infrastructure wherein the electric meters transmit the readings wirelessly. The other end of the wireless communication link could be static (for example a tower/tall utility pole) or a mobile unit (for example, the wireless communication capabilities of all the electric meters within a certain area could be simultaneously turned on from a utility company's van. All of them could then stream their data to the receiver(s) in the van, thereby obviating the need to make individual trips to read each electric meter). It is very likely that the "smart" grid of the future will require substantial amount of information exchange on a continual basis. Accordingly to be ready for such an eventuality, many utilities are also deploying fiber optic communication links besides the power cables. Such a dedicated infrastructure is not necessary for the present invention.

Accordingly, there exists a need for a system, method and apparata that takes advantages of the existing electrical grid and existing and future smart electrical grid technology for securing and/or authenticating network communications, especially those communications transmitted over the Internet by a person or device confirmed to be at a particular location. There exists a need for a system, method and apparata that offer the potential to dynamically establish additional/alternate physically distinct communication path(s) that can serve as secure side channel(s) to bolster the security of all communications wherein at least one of the end-peers is also connected to an electrical grid.

SUMMARY AND OBJECTS OF THE INVENTION

The main advantages of the present invention are second-factor authentication by a separate channel, and location authentication tied to a stationary physically secure electric meter.

The present invention leverages the physical path from a utility substation to an end user's electric meter as a secure side channel for enhancing the security and reliability of electric/electronic communications. The system, method, and apparata of the present invention includes architectures and protocols for various canonical classes of communications services. Such services are contemplated as being delivered over a first network in combination with the electrical grid, and include the employment of a Strong Powerline-Location-Binding and Certification (PLBC), Powerline-Entity-Tracking (PET), Powerline-Monitoring and Emergency Signaling (PMES), and Power Line Anti-Theft Mechanism (PLAM), though those titles are descriptive only and not limiting in any way of the present invention. The present invention is also described in some respects in "Location Authentication through Power Line Communication: Design, Protocol, and Analysis of a New Out-of-Band Strategy," in the Proceedings of the 14th IEEE International Symposium on Power-Line Communications and its Applications, March 2010, the content of which is incorporated herein in its entirety.

The present invention is operable on top of canonical protocol architectures for electronic communications so that a virtually unlimited number of security-enhancement mechanisms may benefit from the present invention, including real-time location based access control to network services, location-aided enforcement of DRM (Digital Rights Management) Mechanisms, verifiable Reliable-Custody-Chains, anti-theft services, among other services.

The security enhancement mechanisms of the present invention may be deployed on their own, or integrated as an additional security feature to strengthen an existing multi-factor authentication system and method.

The present invention requires that signals travel via the electric conductors between a local power distribution station (or a substation) and the end-user's electric meter. Such a path typically constitutes the last hop of the power distribution network.

Accordingly, it is a principal object of the present invention to provide a system, method, and apparata in which the user physically presses a switch to request a location-binding certificate. This prevents the situation where, suppose the user's home computer is compromised and under the control of hackers that can run keyboard loggers and retrieve the user-name, password etc. (when the user types them in). However no one can remotely press a physical switch. Such an apparatus removes the problem of human error. If the user is asked to physically enter a string of alphanumeric characters, there is an increased chance that the user will enter the string with errors. Also, since frequent use of authentication tends to cause users to switch-off/ignore the alarms/safety features of traditional security measure (i.e., ignoring popup warnings about problems with certificates that result in disabling the popup warnings altogether), the present design keeps human interaction at its very basic and makes the process as transparent as possible. Moreover, since a physical action by a human is inherently slower (compared with electronic speeds), even if several malicious users in a local-loop collaborate and try to mount a denial-of-service attack on a server equipped with the present invention, they would be stymied by the present invention involving simply the pressing of a switch.

It is another object of the present invention to provide a system, method, and apparata that are better than the current scheme where the bank sends a random nonce-string to the user's mobile phone as SMS/text and requires the user to enter the text in a browser. The current method only guarantees that the user requesting the transaction is in control of the mobile phone. There is nothing that ties the end-user to a specific location. Thus, hackers that also steal a victim's cell phone or obtain access to their SMS/text message account, will have defeated the security measures. In the present invention, the user and client computer are bound to the true location of the electric meter of the user's residence or business (i.e., stealing a meter is useless; the utility expects a specific meter to be in a specific place).

It is still another object of the present invention to provide a system, method, and apparata that combines the use of global positioning system (GPS) telemetry data as a further location authentication feature. GPS and other location authentication mechanisms are already known, and they are limited in that, unlike the electrical grid, GPS signals can only be "received"; nothing can be sent back via the GPS satellites. Hence, unlike a power-line, the ability to receive GPS signals by itself does not constitute a bidirectional channel. Also, GPS may not be available everywhere and GPS signals could be jammed. As a result, if the user's home computer is compromised, it could block or subvert the transmissions from such devices as a hardware USB dongle that receives and utilizes GPS signals. In any case, if all of the businesses in a building share a common electric meter for the building, then in addition to a certificate from the certificate-generating server of the present invention, other additional factors may be used to distinguish between individual clients (such as one-time-use authentication nonce-strings sent via mobile phones, etc.).

It is another object of the present invention to include direct communications between the server of the present invention and a financial or any other institution's server or servers to exchange more or different authentication tokens (that are not relayed-back through the user).

It is still another object of the present invention to provide a system, method, and apparatus for denying access to sensitive documents originating or stored on Department of Defense (DoD) servers by requiring location-binding proof of the user's identity.

It is another object of the present invention to provide a system, method, and apparatu for enforcing Digital-Rights-Management (DRM) limitations on downloaded copyright works. The provider of the works would release the content only if the user can provide proof of location.

It is still another object of the present invention to take advantage of electrical power transmission infrastructure upgrades that are happening now and in the future that will allow for bidirectional energy transfer. By incorporating the technology of the present invention to such upgrades, a reliable, cost-effective side-channel is available on that infrastructure for securing communications.

It is another object of the present invention to encrypt any sensitive or personal data that passes through a substation so that the third party electric power generator and/or transmitter that operates the substation is not able to view the data. Only publicly available or non-sensitive/non-personal data is not required to be encrypted.

Another advantage of the present invention over existing solutions to tracking electronic devices is the fine-grained location tracking of stolen devices. In the present anti-theft mechanism, location information is obtained at the resolution of the electric meter. In addition, the present PATM protocol protects against replay and forgery of messages. The approach requires hardware-based power line communications support in mobile devices, and fixes the cost for deployment and a marginal maintenance cost for the power line communication infrastructure.

One advantage of the present invention is that it can demonstrate a physical connection to a power line electric meter as well as verify the presence of a human-in-the-loop for purposes of securing a communication over a communications network. Consequently, it is stronger than other methods that rely on cell phones, USB sticks/dongles and other devices that can be stolen (thereby defeating any method that depends on proving that a user is in control of that device).

Note that unlike the Internet, the electrical grids in many countries are not (and should not be) connected to grids in other countries. If this physical isolation is properly leveraged, it can solve most "unauthorized accesses" problems involving unauthorized access of computer systems and networks in one country from hackers located in a different country.

Unlike existing security methods that depend upon mobile phones, smart-cards/dongles, etc., which must take into account the small form factor and power constraints of those devices, the present invention has no such limitations. Frequently, small scales limit the length of cryptographic methods and keys that can be used with such power-constrained devices. In contrast, an advantage of the present invention is that it employs the electrical grid so all the devices involved have unlimited amount of power available, thereby removing artificial constraints on the length of the cryptographic subsystems. Thus strong cryptography can be easily implemented within the present invention.

Moreover, cell phone carrier signals, GPS signals and other wireless beacons may not be available everywhere, especially in long tunnels and underground bunkers/operations centers, such as those housed deep below the Earth's surface. The present invention has the advantage that electric power is typically available in most installations, whether above or below ground.

Also, the present invention is less susceptible to eavesdropping or jamming when compared with freespace/GPS based systems. Freespace communications are more susceptible to eavesdropping as well as jamming.

Despite the trend toward diminishing diversity of data paths, electric wires are not likely to be replaced. Today a typical household has many different ways to connect to the Internet: cable, phone lines, wireless-broadband, satellite links, etc. The trend, however seems to be that all data pipes will eventually be consolidated into a single physical data pipe (most likely an optical-fiber or a fiber-bundle) that has all the bandwidth needed to satisfy most end applications. Thus, the diversity of communication paths is being reduced. With widespread adoption of voice-over-IP technology, people are rapidly abandoning the good-old-fashioned phone lines and switching to Internet telephony. It hardly gets noticed that the "911" and other emergency calls are therefore also going through the Internet, which makes such signals susceptible to hackers who obtain the sender's IP address assigned to a router at a residence, who can then mount a Denial-of-Service (DOS) attack on that IP address and render the Internet and hence the phone-line useless. It is a real possibility that perpetrators could first disable emergency signaling mechanisms (for example, by mounting a DOS attack as mentioned above) and then carry out the physical assault/crime at the residence or business. But independent of how much consolidation occurs among the "data connectivity providers", electric power lines and the electrical grid are not replaceable. In fact a large number of households in the US (typically at the extreme edges of suburbs or in rural areas) may not be connected to public/shared water and sewer lines (bore-wells and septic tanks are fairly common). These houses typically do not have cable/fiber connections either; but they have electricity because they are connected to the electrical grid. It is safe to assume that the electrical grid is a canonical hallmark of modern civilization and is likely to have a substantial penetration. The present invention leverages that irreplaceable electric connection to a residence or business as a physically separate, independent communication path for authentication, for theft reporting, and entity tracking.

Fundamentally, electric power lines were and always will be designed to carry electric power efficiently, not to transmit communication signals. It is therefore futile for utilities to compete with optical fibers and other technologies that are specifically developed for high bandwidth/broadband communications (in rural areas where cable/fiber networks have not yet reached, broadband over power lines may be the only option). The present invention does not rely on an open power line spectrum for general; rather, it uses the electrical grid only for implementing a physically separate control/authentication plane.

Another advantage of the present invention is that the hardware and software required to implement the various systems and methods are incrementally deployable and are relatively cheap to implement.

The present invention is bootstrapped to existing systems, methods and apparata, so replacement or modification to existing systems and methods are not required. Quite to the contrary; the present invention augments/complements wireless, GPS-based and other authentication methods by creating another corroborating and complimentary infrastructure.

In summary, as a bidirectional out-of-band authentication channel, the present invention is attractive for several reasons. The electrical grid is highly reliable and widely available, including in many locations (e.g., inside a building, in an underground or underwater facility, or in a remote area) where wireless communications or GPS signals are obstructed or unavailable. The present invention can provide fine grain location authentication, at the resolution of electric circuits serviced by a particular stationary electric meter. Such resolution is typically more accurate than that provided by cellular telephones. Although GPS data can often yield highly accurate locations, when inside a building, or even outside a tall building, where GPS signals may not be received, the present invention can sometimes determine locations more accurately than systems relying on GPS data. For some users, the present invention is more convenient than communication over landline or cellular telephone: a user might not have a cellular telephone, and cellular telephones can be lost or stolen. Also, the present invention has relatively low cost for environments that already have power service, including both the fixed costs of adding the invention to a electrical grid and the marginal costs of adding additional users.

Briefly described, the above and other objects and advantages of the present invention are accomplished, as embodied and fully described herein, by a system comprising an application server, power grid server, power grid substation, user, user's computer, electric meter, and human authorization detector with display and physical button(s)—located between the client's workstation/power line communication and an electric meter. The user obtains a location certificate from the power grid server via the present invention, which the user forwards to the application server over the Internet. The human authorization detector plays a crucial role in mitigating the threat of possible compromise of the user computer or home network: the user must push the button on the human authorization detector to authorize any request for, and receipt of, any location certificate generated by the protocol of the present invention. The system takes into consideration the special characteristics of the invention, including low bandwidth and the hierarchical structure of the power line network involving electric meters, substations, and power grid server.

The invention satisfies the following problem requirements. An active network adversary intercepting all Internet and power line communications, and even corrupting the user's computer, must not be able to forge, modify, or replay certificates without detection. Also, the adversary must be unable to learn any of the secrets stored on the electric meter, human authorization detector, or electrical grid components.

The advantage of the present invention includes a human-in-the-loop authorization, enforced by the human authorization detector, and enabled by a location certificate structure that includes application transaction data. With traditional second-factor authentication (including typical dongles), malware on the user computer could execute a MitM attack in which the malware changes critical transaction data (e.g., the destination account of a bank transfer). By contrast, an object of the present invention would allow the user an opportunity to notice such changes on the human authorization's display, and the application server would notice any modified certificate. The concept of a human authorization device has been well known in the electronic commerce folklore since the 1980s. It is an essential feature for authenticating transactions securely.

The location granularity of the present invention is at the resolution of an electric meter. How this resolution compares with those of competing approaches depends on context. For many applications (e.g., home banking), it is significant to know that a signal came from the user's home electric meter. By contrast, a GPS system might be unable to distinguish between signals emanating from within a house versus from immediately outside the house. Individual units in apartment buildings typically have separate electric meters. Although some electric meters might service large areas within large buildings, often it is significant to know that the signal emanated from within a corporate building.

A variety of communication paths are possible among the application server, user, and the power grid server. For example, the application server could contact the power grid server directly. The present invention forces all certificate requests and deliveries to pass through the human authorization detector, to mitigate the threat of possible MitM malware on the user computer.

As with any strong security feature, there is a risk that the strong feature might deny service to intended uses. For example, the power line network might not be available after a hurricane. The application server authentication policies are carefully chosen to avoid this problem. In principle, the system of the present invention may work on battery backup power sources using just the conducting path of the electrical grid.

The present system design is consistent with the constraints of power line networks. The architecture and protocol (including the human authorization detector) are independent from the power line channel. Thus, in the present invention, the power line channel could be replaced with other second channels.

DETAILED DESCRIPTION OF THE INVENTION

Figure 1:
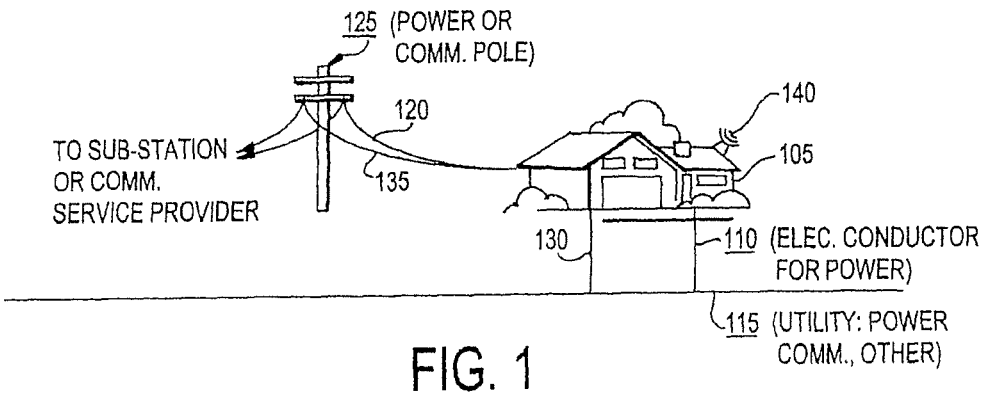
FIG. 1 is a schematic drawing of an end-user structure receiving electrical and communications services from third-party service providers.

Several preferred embodiments of the present invention are described for illustrative purposes, it being understood that the invention may be embodied in other forms not specifically shown in the drawings. The figures will be described with respect to the system architecture, various apparata, and methods for using the system and apparata to achieve one or more of the objects of the invention and/or receive the benefits derived from the advantages of the invention as set forth above.

Turning first to FIG. 1, shown therein is a schematic drawing of an end-user receiving electrical power and data communications services from a utility company and an Internet service provider, respectively. A private residence or commercial building structure 105 is shown. In a typical scenario, a user 100 (not shown) subscribes (pays for) various electrical, communications, and other services provided by third parties (typically, commercial companies) for the direct benefit of the user him or herself, or for the benefit of the residents or other persons present within the structure 105. In FIG. 1, only electrical and communications services are shown for illustrative purposes.

The electrical services are provided to the structure 105 by way of one or more buried underground shielded electrical conductors 110, which branch from an underground utility conduit 115 (often through an aboveground electrical switch box, not shown). These electrical services are provided, typically, by an electric power distribution/transmission company. The electrical services may also be provided to the structure 105 by way of overhead shielded electrical conductors 120, which drop from a nearby power pole 125. The electrical conductors 110 and/or 120 are connected to a meter and or electrical distribution panel on or within the structure 105. The service is carried to various locations within the structure 105 by way of standard household- or commercial-grade copper or aluminum wires to electrical outlets.

The communications services are provided to the structure 105 by way of one or more buried underground shielded electrical conductors or optical fibers 130, and/or from overhead shielded electrical or fiber optic conductors 135, or via a satellite link 140. Other communications services, for both data and voice communications, may be provided to the structure 105 using other methods, including, but not limited to, wireless telephony devices, such as mobile or fixed cellular devices (not shown).

Figure 2:
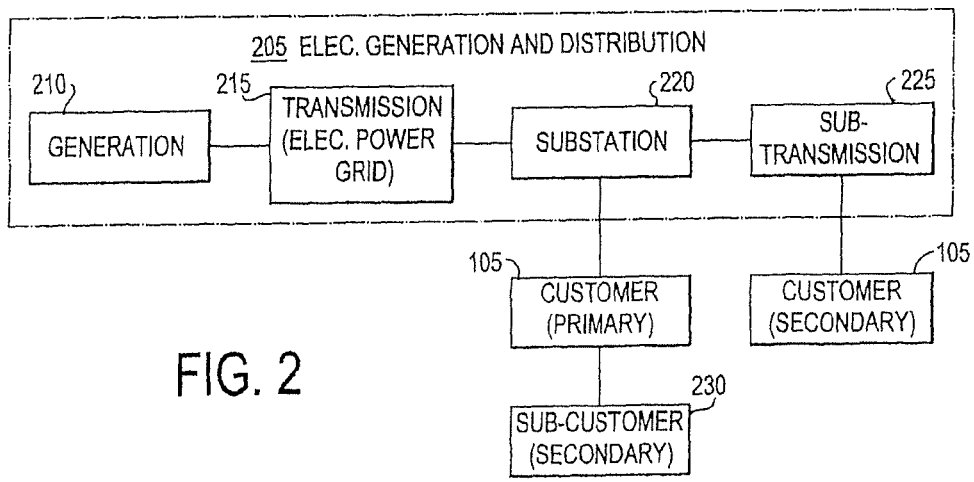
FIG. 2 is a block diagram of a basic electrical generation and distribution network according to one aspect of the present invention.

Turning now to FIG. 2, shown therein is a block diagram of a basic electrical generation and distribution network 205 according to one aspect of the present invention. As shown, an electrical generation system 210 is located at one end of the generation and distribution network 205. The electricity thus generated is transmitted over an electrical (power) grid 215 to one or more substations 220 (only one shown). The electricity may be sub-transmitted from the substation 220 by a separate electrical grid 225 (which may or may not be similar or identical in structure to the electrical grid 215). The electricity from the substation is delivered to one or more customer(s) at their respective structures 105. In the case where a structure contains more than one subscriber (e.g., sub-tenant), the electricity may be delivered to a sub-customer 230 (i.e., secondary end-user, such as the sub-tenant on a separate electric meter).

In the present invention, the electric power service provider is a trusted party that controls all of the substations 220. Each substation 220 communicates with one or more electric meters (discussed below), for example on a shared bus, and each electric meter may have a unique secret identifier, as noted below. Typically, there are approximately 5,000 electric meters per substation 220. Each substation 220 performs asymmetric encryption and is connected to the power grid server (also discussed below) through, for example, a private IP network, using, for example, WiMax or GPRS. Each substation 220 has a unique SubStation Secret Identifier (SSSI) known to all electric meters it controls.

Figure 3:
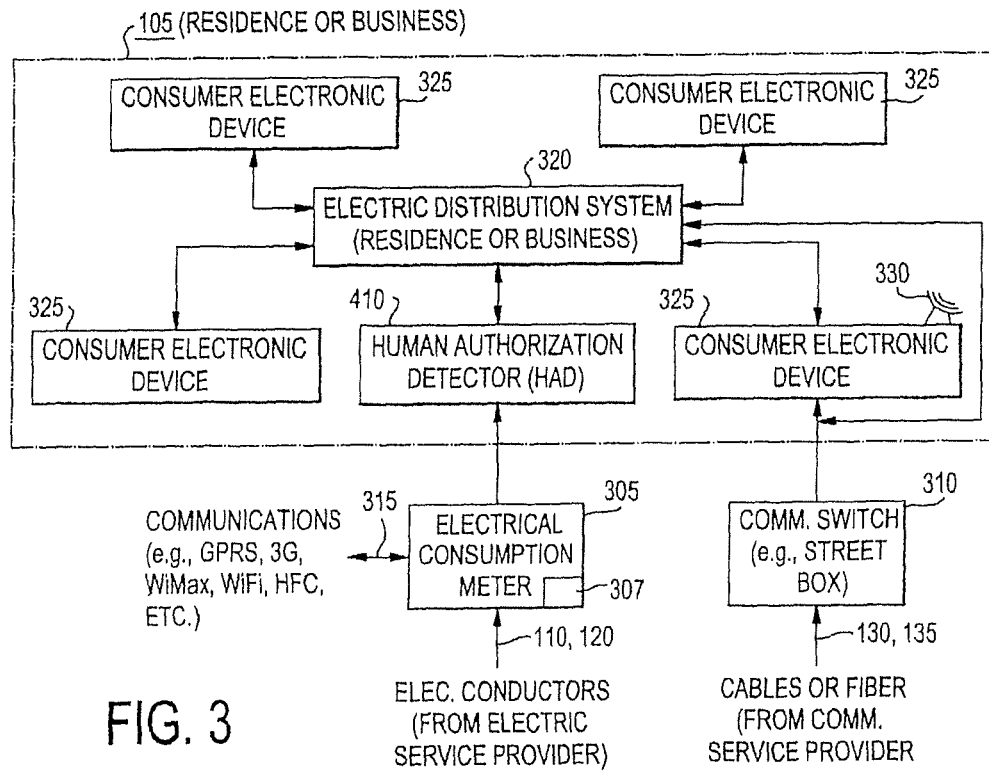
FIG. 3 is a block diagram of the subscriber end of the generation and distribution network of FIG. 2 shown with various electrical devices connected thereto.

Turning now to FIG. 3, shown therein is a block diagram of the subscriber end of the generation and distribution network 205 discussed above and various electrical devices connected thereto. In this drawing, the cable or fiber conductors 130 and/or 135 are shown attached to a communications switch (in this case, a street meter or switch box) 310, which is associated with the structure 105 (typically, a street distribution box might service several separate structures).

The electrical conductors 110 and/or 120 are shown attached to an electric meter 305 at a termination point inside the electric meter 305.

The electric meter 305 is itself attached to or associated with the structure 105 (in this case, a residential house or commercial business). Typically, for a relatively small electrical subscriber, like an individual residence, the electric meter 305 may be attached directly to the residential structure 105 (accessible to the service provider). For a large subscriber, like an industrial facility that consumes a large amount of electricity, the electric meter 305 may be located at or closer to the substation 220.

As shown in the figure, the electric meter 305 may be equipped with circuits for generating and transmitting communications (typically data) over a separate circuit 315 using one of several data protocols (for example, GPRS, 3G, WiMax, WiFi, HFC, etc.). This channel may be used, for example, in the case where the electrical conductors 110 and/or 120 are severed accidentally or intentionally. Also, this channel may be used to facilitate access to the electric meter 305 by the electric utility company for various functions, including updating software and downloading electric power consumption data. The signal sent via the channel of circuit 315 may be received by another electric meter 305 at another location (i.e., the residence next door), and then relayed via the electrical grid. Thus, even in the case where a hacker compromises the electrical conductors 110 and/or 120 as well as the electrical or fiber optic conductors 130 and/or 135, a request for a location certificate can still be sent.

The electric meter 305 in each home or residence communicates with its respective substation 220 over low and/or medium voltage power lines. The electric meter 305 is a trusted, physically-secure device with limited computing resources. For purposes of the present invention, the electric meter 305 has a unique public name and a private Meter Secret Identifier (MSI), also known by the substation 220 and a separate power grid server (discussed below).

For additional security purposes, the electric meter 305 may include tamper-resistant hardware, such as a TPM tamper switch, to protect its MSI and cryptographic keys. The electric meter 305 also preferably includes hardware and software for monitoring the tamper-resistant hardware and storing in a memory device information related to the tamper-resistant hardware. That stored information may be downloaded or transmitted over, for example, the communications circuit 315, to report any potential breaches of the tamper-resistant hardware.

Each electric meter 305 includes a unique identification tag known only to the service provider (i.e., utility company, or a third party company providing this infrastructure on behalf of the utility company).

All communications to and from the electric meter 305 will be encrypted with keys stored in tamper-proof hardware within the electric meter 305 itself. In addition to the unique identifier known only to the utility, each electric meter 305 will also be equipped to generate one-time usable virtual/temporary identifiers. This may be done, for example, by modular routes or one-way hash chain or any other method that generates one-time-usage tokens.

Hardware modules for implementing the present invention may be installed in series with the electric meter 305, on either side of it (separate devices), or integrated in the electric meter 305 itself. Thus, the electric meter 305 of the present invention may be a modular system involving an existing electric meter 305 that includes separate components implementing the present invention, or the electric meter 305 may be a completely custom device. The separate components necessary to communicate with the human authorization detector 410 may be housed separately, and placed remotely from the electric meter 305 (that is, all of the features of the electrical meter 305 that make up the present invention do not have to be enclosed with in the single meter device).

The electric meter 305 is equipped with an independent backup power supply 307, which may be used to supply electrical power when the electric power is no longer available from the regular electric service provided by the structure 105. That is, when electric power does not conduct to the structure 105 through the available electric conductors 110 (below ground connection) or 120 (above-ground connection), the electric meter can still operate on batter backup power until regular electrical service is restored to the structure 105.

In the present architecture, the last hop substation 220 to the electric meter 305 is a secure, reliable channel between the substation 220 and each individual electric meter 305 (i.e., subscriber). Note that in the local loop, all the electric meters 305 can and typically do share the same physical path up to the substation 220. Consequently, there is potential for eavesdropping, denial of service, replay attacks, etc., if one of the electric meter 305s in a neighborhood or business complex is compromised. Accordingly, the protocols for this hop have the following features:

(1) Individual electric meters 305 request from a channel master a permission to transmit (if there is anything to transmit).

(2) The substation 220 may be the channel master/arbitrator deciding whom to give the control of the channel to and for how long.

(3) The available bandwidth may be shared as efficiently, equitably and fairly as possible. The "efficiency" criteria implies that if only one customer has something to transmit and no other electric meters 305 have anything to send/or receive, then that subscriber should get all the bandwidth it wants as long as no-one else has anything to transmit (somewhat similar to a "Slotted-Aloha" protocol and Rivest's Bayesian Backoff schemes characterized by high efficiency and low channel acquisition-latency/delay at light loads). On the other extreme, for whatever reason, if all subscribers want to transmit at the same time, the protocol may dynamically adjust its behavior and work like a slotted TDMA protocol, wherein the available bandwidth is guaranteed to be shared fairly and equitably.

(4) Guaranteed in-time delivery, i.e., using protocols that are better than "best effort" protocols used in, for example, the Ethernet protocol.

(5) Although the Ethernet protocol creates wasteful copper bandwidth at high overall traffic loads, i.e., too much freedom to individual stations to transmit at will causes a terrible degradation of performance in the Ethernet protocol at high loads, the Ethernet was the first protocol to be rolled out and hence it quickly became the de-facto standard. The present protocol may use the "Urn" protocol or the "Adaptive tree-walk" protocol, as discussed in A. S. Tanenbaum, *Computer Networks* (2002), to implement the present invention.

(6) The privacy/anonymity of information between the substation and electric meters 305 are integrated into the system, but may be provided at different levels; i.e., the quality of service may differ (higher privacy/anonymity for a higher fee).

(7) The electric meter 305 includes a smart circuit and software subsystem that knows enough to expect certain kinds of information or codes from the human authorization detector 410, depending upon the type of transaction begun at the application server 420. The smart circuit and software subsystem may deny a request for a location certificate independent upon whether the human authorization detector 410 has forwarded the request after receiving an "accept" input from the user.

Referring to FIG. 3 again, with regard to the structure 105, the electrical conductors 110 and/or 120 (electrical power service), are connected to the electric meter 305 on one termination inside the electric meter 305, and the human authorization detector 410 (as further described below) is connected to the electric meter 305 at a second termination inside the electrical mater 305. The human authorization detector 410 is connected to an electric and data communications distribution system 320, which, as described above, may include various electrical conductors, as well as cable conductors and fiber optic conductors, all of which are strung throughout the structure 105 and connected to outlets, receptacles, or other types of terminations. The electrical conductors and/or optical fibers 130 and/or 135 (i.e., a data, voice, etc. communications service) are connected to the structure 105 via a data communications switch 310, such as a green-colored utility cabinet outside the structure 105. One or more consumer electronic devices 325 inside the structure 105 may be physically connected to the distribution system 320 during their operation. Another consumer electronic device 325 may be physically connected to the distribution system 320 while it is charging, but then operated wirelessly using a wireless transceiver 330 at other times, or directly connected to the switch 310. The specific connectivity between electronic devices 325 and the electrical or data communication services provided to the structure 105 is not important; what is important is that the various electronic devices 325 are able to connect to at least one human authorization detector 410 and the electric meter 305 at some point during their operation, and that no data communications device be able to bypass the human authorization detector(s) 410 and directly communicate with the electric meter 305.

The distribution system 320 inside the user's residence or business structure 105 may utilize the HomePlug home-network. The connection between this home-network and the electric meter 305 is the "connection" to the side channel infrastructure at large. The protocols and the modes in which an electronic device 325, such as a user's computer, operates while connected with the human authorization detector 410 includes, but is not limited to, the ability to provide two-way communications, i.e., when a subscriber/end user wants the electrical grid to carry a small message (such as a request for an authentication token or a token itself etc.). In the present invention, there could be a charge for this type of service, but it will be completely transparent to the end-user.

Figure 4:
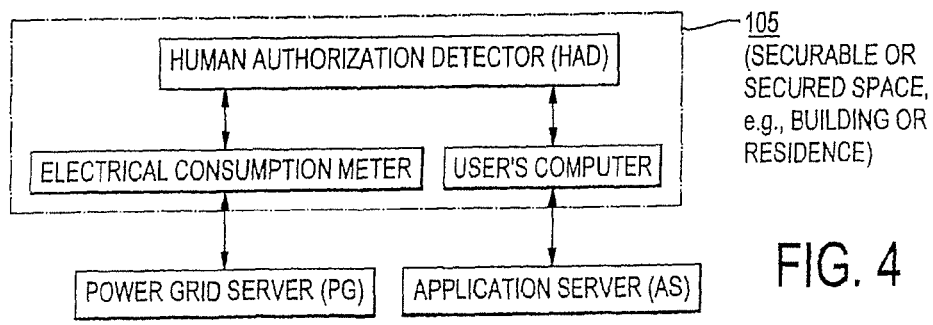
FIG. 4 is a block diagram of one embodiment of the present invention.

Turning to FIG. 4, shown therein is a block diagram of one embodiment of the present invention. In particular, the structure 105, which could be a secured or securable space, includes an electric meter 305 (shown inside the structure 105 in this embodiment), connected directly to the human authorization detector 410 and then to a consumer electronic device (as depicted in FIG. 3), which, in this figure, is shown as a user's (client) computer 405. The electric meter 305 is also shown connected to a power grid server (PG) 415, which in this embodiment is shown outside the structure 105, but may be located inside, or part of inside and part outside the structure 105. The user's computer 405 is shown connected to an application server 420. The electric meter 305 and user's computer 405 are also shown attached to a human authorization detector 410, which is contemplated as being co-located next to or proximate the user's computer 405. For every electric meter 305, there is at least one human authorization detector 410. Additional human authorization detectors 410 may be connected to the electric meter 305. Each electric meter 305 includes hardware and software for reporting any tampering with the electric meter 305.

Figure 5:
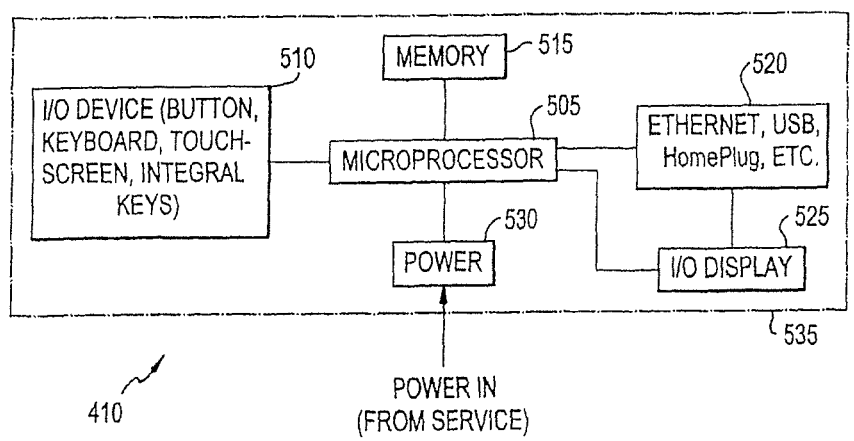
FIG. 5 is a block diagram of a human authorization detector according to one aspect of the present invention.

As shown in FIG. 5, the physically separate human authorization detector 405 includes, but is not limited to, a microprocessor 505, input/output device 510, memory device 515, communications device 520, input/output device 525, and power supply or transformer 530, and tamper proof housing 535 for all or a portion of the human authorization detector 405. It may also include an automatic location information device (such as a GPS receiver), wireless transceivers, infrared/optical communications devices, and acoustic communications devices.

The microprocessor 505 may be any suitable processor with sufficient memory for storing software loaded in the memory device 515, or it may included embedded software. The software operates with the microprocessor to process information received from the user. That is, at is most basic structure in the embodiment of a switch, the software receives a signal indicating that the switch has been activated (i.e., a current flow or a voltage drop at a power storing device).

The input/output 510 may be, for example, a button, keyboard, or touchscreen for entering or providing information. The input/output device 525 may be, for example, a digital display for displaying information to the user. The software operating in conjunction with the microprocessor receives an input from the input/output devices 510 and uses that information to generate a payload to be outputted via the communications device 520, which may be an Ethernet, USB device, or circuit compatible with the HomePlug protocol, etc. That package, along with information about the human authorization detector 410, such as a unique ID or other information permanently stored in memory, is then sent to the electric meter 305.

The software also maintains information about the status and integrity of tamper-resistance features of the human authorization detector 410, such as its tamper-resistant or tamper-proof housing 535, which may provide a secure housing for the entire human authorization detector 405, or a portion of the human authorization detector 405, such as just the input/output device 510. Thus, the memory will store a record when the device is unplugged, the housing 535 is opened, etc. The input/output 510 includes a port for downloading or printing information about security breaches, and all of the location certificate requests sent to the electric meter 305 each day. This way, the device is a self-contained forensic tool that reports suspicious activity. That is, the human authorization detector 410 stores in memory information about events and outputs that information to, for example, the power grid server 415 indicating whether there have been any attempts that are or have been made to tamper with the human authorization detector 410 or whether it has been successfully tampered with. This information is stored and/or outputted as soon as one or both of those events are detected, or during a pre-determined monitoring period (e.g., every hour), or when the it or an outside entity performs a regular forensic audit of the human authorization detector 410.

The power supply/transformer 530 provides electrical power to the human authorization detector 410. The device can be used to transform or convert the standard household or commercial voltage to a voltage needed to power the electrical components of the human authorization detector 410. The device could also be a backup power supply that provides electrical power when the electric power is no longer available from the regular electric service provided by the structure 105. That is, when electric power does not conduct to the structure 105 through the available electric conductors 110 (below ground connection) or 120 (above-ground connection), the human authorization detector 410 can still operate on batter backup power until regular electrical service is restored to the structure 105.

The human authorization detector 405 is a trusted bridge between the user's computer 405 and the electric meter 305. Using the input/output device 510, the user accepts or denies requests for and deliveries of location certificates displayed on input/output 525 (which may also be displayed on the user's computer 405). Thus, transaction data are bound to the certificate, and these data are shown on the human authorization detector 405. The human authorization detector 405 also limits denial-of-service attacks from the user's computer 405 to the electric meter 305. It ignores all incoming data from the user's computer 405 except for requests for location certificates (or other pre-determined specific types of messages).

Using a public/private key system is not feasible between the human authorization detector 410 and the electric meter 305, and therefore a pre-arranged security scheme is used. The action of inputting an instruction by the user to accept a location certificate request (or, in simple terms, pressing a switch), generates the next encryptographic token in a chain, which the electric meter 305 is expecting. The human authorization detector 410 also may be used by more than one user who input a unique code so the device knows which user is operating the device.

The human authorization detector 405 may also be operated automatically (operating the device manually would be the default mode when it is first initialized, during powering up after power loss, during a system reboot, etc.). The human authorization detector 405 may be switched from automatic to manual mode, or vice-versa, by physically changing a console setting using, for example, the input/output device 510. In automatic mode, certain pre-determined requests for location certificates may be accepted automatically without a human providing any input, such as those involving transactions that are pre-determined as being low risk targets to hackers, or for which the human authorization detector 405 is pre-programmed to expect from a known application server 420.

Also, the human authorization detector 410 includes a diagnostic software subsystem that collects information about all transactions and stores the same in the memory device 515.

Also, location certificate requests may be batched, such as those received during off hours when the users are not present. With one input, several location certificate requests may be accepted or denied all at once (or some accepted and some denied). In automatic mode, for example, the human authorization detector 410 may outputs a random token.

In manual mode, as noted above, a specific token is preferably generated in sequence in a one-way chain. The physical pressing of switch causes the human authorization detector 410 to output/use a different set of cryptographical tokens, whereas automated traffic causes the human authorization detector 410 to use a distinct set of tokens. The important point is that the electric meter 305 can identify and discriminate which sequence of (one-time or single use only) tokens is being used by the human authorization detector 410. The electric meter 305 also knows that transactions of a certain type (i.e., ID "X") must be authorized by a physical pressing of a switch at the human authorization detector 410, and it can verify whether that action happened or not, from the sequence of cryptographic tokens sent to the electric meter 305 by the human authorization detector 410. Thus the electric meter 305 and the human authorization detector 410 together have intelligent software and hardware to deny transactions predetermined as super-critical unless they are actually authorized by a physical pressing of a switch by the user. On the other hand, the transactions that are not pre-determined to be ultra-critical can request the human authorization detector 410 for a location certificate. Such requests are first logged/outputted at the human authorization detector 410 and then sent to the electric meter 305 as usual.

The human authorization detector 410 will become the "rate-limiting" feature in case the user's computer is compromised and the adversary tries to mount a denial of service attack using that computer. All such attempts would be reported to the power grid server 415 as well as to other monitors (likewise, the human authorization detector 410 as well as the electric meter 305 hardware components used are not only tamper-resistant, but they also report any/all attempts to tamper with them.

Figure 6:
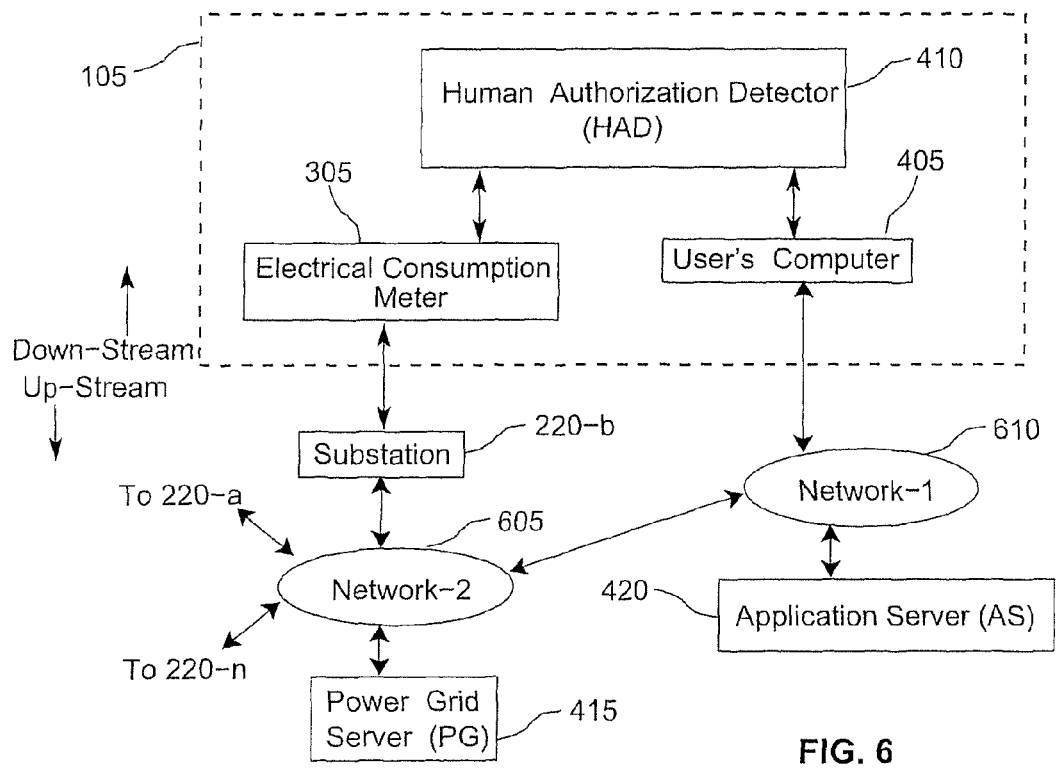
FIG. 6 is a more detailed block diagram of the embodiment shown in FIG. 5.

Turning to FIG. 6, shown therein is a more detailed block diagram of the embodiment shown in FIG. 5. In particular, the power grid server 415 is connected over a communications network 605, to a plurality of substations 220a, 220b, . . . 220n. Thus, the power grid server 415 may service multiple substations. Data transmitted across the network 605 could be secured, such as by using a secured socket layer (SSL) or the transport layer security (TLS) protocol. The application server 420 is connected to the user's computer 405 by a communications network 610, which may be, for example, the Internet. Data transmitted across the network 610 could be secured, such as by using SSL. The networks 605 and 610 are, as shown, separate networks connected to each other, but they could be the same network, i.e., the Internet. Thus, in that embodiment, the side-channel of the present invention would consist of the path between the substation 220 and the electric meter 305.

Figure 7:
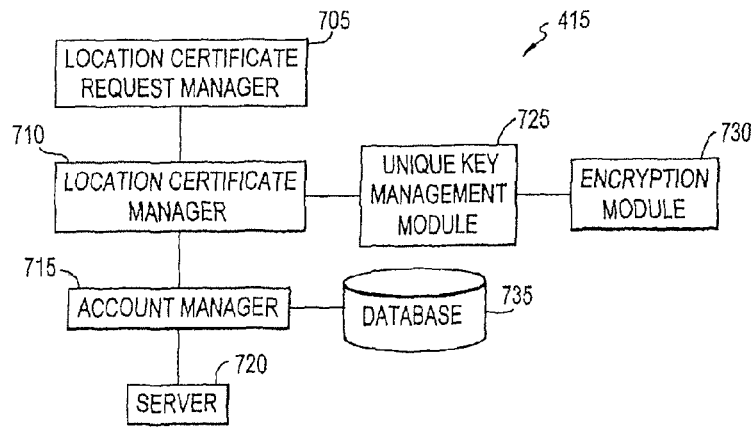
FIG. 7 is a block diagram of a power grid server according to the present invention.

FIG. 7 is a block diagram of the power grid server 415, which is a trusted party, and includes several subsystems, including a location certificate request manager 705, a location certificate manager 710, a unique management key module 725, an encryption module 730, an account manager module 715, and a server 720. Each of those subsystems may be embodied in hardware and/or software. Those subsystems perform various functions, as described below, including but not limited to, tracking the number of transactions The location certificate request manager 705 has several functions, including but not limited to collecting, storing, processing, and transmitting location certificate requests from the human authorization detector 410. The location certificate manager 710 also has several functions, including but not limited to generating and outputting location certificates. One embodiment of the management key module 725 creates, stores, and processes, or performs other activities related to the unique long term encryption module 730, which may be based on Key Management Keys (KMK). The encryption module 730 creates, stores, processes, and performs other activities related to the encryption, including producing unique Management Keys (MK). Any standard Key management scheme can be plugged in.

In one embodiment of the invention, keys are managed, following the REMPLI model, primarily by the power grid server 415 in three levels. Each electric meter 305 shares a unique long term KMK with the power grid server 415. Similarly, each substation 220a, 220b, . . . 220n shares a unique long-term KMK with the power grid server 415. These KMKs are provisioned at the factory. For each electric meter 305, the power grid server 415 establishes a unique Management Key (MK), which it shares with the substation 220 and electric meter 305 by encrypting it with the KMKs. Using the MK, a unique working key is established for each electric meter 305 and shared with the substation 220 and the power grid server 415. The power grid server 415 and each substation 220 has its own public/private key pair, managed by a Public Key Infrastructure (PKI). The application server 420 knows the public key of the power grid server 415.

The account manager module 715 includes hardware and software for managing individual user account information, including user profile, billing, invoicing, receivables, addresses, historical information, electric meter 305 information, location coordinates, preferences, outages, usage and other statistics, and all other kinds of data and records relating to the management of a user's account. This information may be stored in a database 735 (which may be a distributed database stored in multiple databases). The substation 220 and the power grid server 415 maintain encrypted logs.

The server 720, which may be the power line communications server mentioned above, is any conventional server providing responses to requests made by a client computer connected to the power grid server 415. The power grid server 415 communicates with the substations 220a, 220b, . . . , 220n using SSL.

Figure 8:
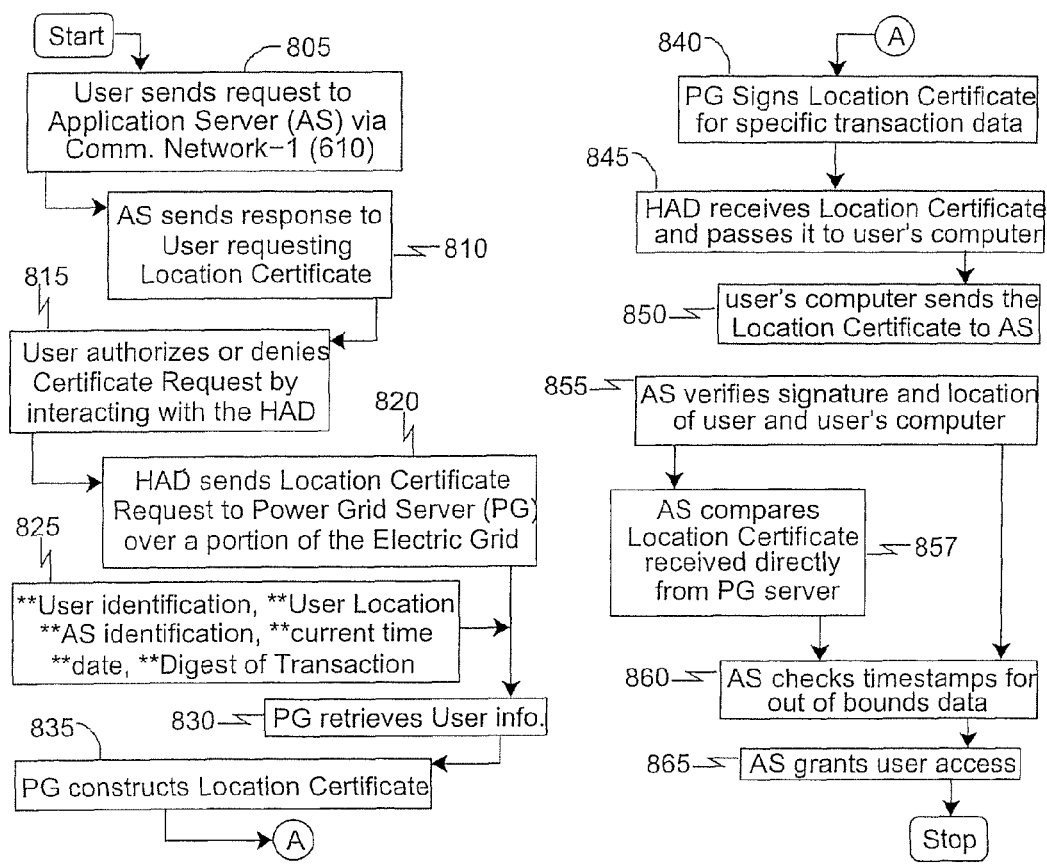
FIG. 8 is a block flow process diagram illustrating one embodiment of the present invention.

Turning now to FIG. 8, shown therein is a block flow or process diagram illustrative of one embodiment of the present invention. For ease of reference, the flow of the request for a location certificate from the human authorization detector 410 to the power grid server 415 is in the upstream direction (as depicted in FIG. 6).

In step 805, the user sends a request, using his or her computer 405 to the application server 420 via a communications network, i.e., the Internet. The application service 420 may be, for example, a web server that runs a web store or financial institution website.

In step 810, the application server 420 sends a response to the user's computer 405 requesting a location certificate (LocCert). The user's computer 405 may also request the LocCert by itself when it recognizes a particular application server 420 by that server's fixed IP address, domain name, or by other means, but this would by-pass the human authorization detector 410 and its full advantages and benefits, and therefore is a less preferred method.

In step 815, the user authorizes or denies the certificate request by activating the human authorization detector 410, which presumably in this example is proximate to the user and the user's computer 405, but it could be located in a different part of the structure 105. Additional security measures could also be used, including checking for a user's physiological parameters (e.g., fingerprints, retina patters, etc.). The trusted human authorization detector 410 resides between the user's computer 405 and the structure's 105 electric meter 305, securely connected by dedicated, physical wires running any well known protocol.

In step 820, the human authorization detector 410 submits a location certificate request (LocCertReq) to the power grid server 415 using, as indicated above, the electrical grid as a side channel that is physically separate from the communications channel between the user's computer 405 and the application server 420.

As indicated in more detail below, the LocCertReq includes, as shown in step 825, specific information needed by the power grid server 415, including at least the following parameters: a user's location, user's identification, application server identification, transaction data, and the current time.

In step 830, the trusted power grid server 415 constructs the LocCert, in addition to performing other functions, including those noted above relating to the location certificate request manager 705, a location certificate manager 710, the management key module 725, the KMK encryption module 730, the account manager module 715.

In step 835, the power grid server 415 retrieves user's information from account manager module 715 to record necessary transaction information, including billing and invoicing for the transaction.

In step 840, the power grid server 415 signs the LocCert being requested for the specific transaction. Additional safeguard parameters may also be added to the LocCert in addition to the signature.

In step 845, the human authorization detector 410 receives the LocCert and checks to see if the power grid server 415 sent the correct LocCert for a particular transaction. It does this by retrieving the transaction data stored in memory. If that verification step is satisfied, the human authorization detector 410 passes the LocCert to the user's computer 405.

In step 850, the user's computer 405 sends the LocCert to the application server 420.

In step 855, the application server 420 verifies the LocCert signatures and location of the user and the user's computer 405.

In step 857, optionally, the application server 420 compares the LocCert it receives from the user's computer to the LocCert is receives directly from the power grid server 415. In that scenario, the power grid server 415 would directly send a copy of the LocCert to the application server 420 via the networks 605 and/or 610.

In step 860, the application server 420 checks the timestamp on the LocCert to see if it is within a pre-determined time limit; if it is not timely, the LocCert will be rejected and another one requested. If it is timely, in step 865, the application server 420 will grant the user's computer 405 access to the application server 420.

The above process is descriptive of the general manual mode of operating the human authorization detector 410. In an automatic mode, at step 815, the human authorization detector 410 would automatically authorize (or deny) the certificate request(s) it receives by interrogating the transaction data provided by the application server 420 and comparing the same to certain stored parameters, or by simply looking up the stored parameters without any comparison step. The stored parameters may include, but are not limited to, a timestamp, the local time, the identification of the application server 420, the form of the request, how many other requests have been received from the same application server 420 during a pre-determined time period, how many total requests have been received from all sources during a pre-determined time period, the last time a request was received from the application server 420, the nature of the transaction data (i.e., the amount of the transaction), etc.

The process described above mitigates the threat of a possible MitM attack emanating from a compromised computer, because the user authorizes or denies certificate requests and deliveries by requiring the physical pushing of a button on the human authorization detector 410. Messages between the human authorization detector 410 and the power grid server 415 flow through the hierarchical electrical grid (i.e., power line network), which includes the user's electric meter 305 and the substation 220.

By way of further illustration, the power grid server 415 controls the power line location authentication protocol (PLAP) of the present invention, which is a term provided here for descriptive purposes only, and not to limit the invention in any way. This protocol includes four parts as described below in more detail, which is an example only. In summary, the four parts are: communication between the user's computer ("C") 405 and the application server ("AS") 420 over the Internet; communication between the user's computer 405 and the power grid server 415 over the power line network to obtain a location certificate; human-in-the-loop authorization using the human authorization detector 410; and the user's computer 405 relays the location certificate to the application server 420 over the Internet.

1. Communication between the user's computer 405 and the application server 420 over the Internet:

| | |
|---|---|
| C → AS (request service) | In this case, the user requests service from the application server. Request is sent through SSL tunnel which is established between user's computer and application server for secure communication. |
| AS → C (ask for location certificate) | Here, if the situation requires it, the application server asks user to authenticate his location. |

2. Communication between the user's computer 405 and the power grid server 415 over the electrical grid to obtain location certificate, via the human authorization detector 410 ("HAD") and the electric meter 305 ("M").

| | |
|---|---|
| C → HAD (LocCertReq (UID, ASID, D) | The user requests a location certificate from the power grid server 415 via the HAD for transaction data details with the application server. |
| Human-in-loop test using the HAD | HAD displays transaction data D on the I/O display (e.g., a small LCD screen) and asks user to accept or deny the associated location certificate request by pressing the accept or deny button on the HAD. If user accepts, HAD saves data D for some time period for later display. |
| HAD → M: LocCertReq(UID, ASID, h(D)) | If user accepts the location certificate request, HAD relays it to the electric meter, replacing the transaction data D with its hash h(D). Sending h(D) rather than D protects user privacy from PG and reduces the number of bits needed to be transmitted over the |

-continued

| | |
|---|---|
| M → SS: Mname, TS1, R1, HMAC(MSI, (Mname, TS1, R1)) | low bandwidth power line network. M = electric meter; h(D) These three messages between meter and substation compose the Meter Authentication Protocol (MAP) explained in Section IV. All communications between M and SS are encrypted with symmetric encryption under the working key. It would be possible to augment MAP with additional mutual authentication checks by SS and PG of their power signatures. |
| SS → M: Mname, TS2, HMAC(SSSI, (Mname, MSI, TS2, R1 + 1)) | |
| M → SS: Mname, UID, ASID, h(D), TS3, R2, HMAC(MSI, (Mname, UID, ASID, h(D), TS3, R2)) | |
| SS → PG: Mname, UID, ASID, h(D), TS4, R3, HMAC(MSI, (UID, ASID, h(D), TS4, R3)) | After successful mutual authentication between meter and substation, substation establishes SSL tunnel with power grid server and relays the location certificate request from meter to PG. |
| PG processes location certificate request | From Mname, PG looks up MSI and uses it to verify the HMAC construction. PG also verifies the timeliness of the time stamp. If these verifications succeed, then PG constructs the appropriate detail of LocInfo of user to include in the location certificate being created for the application server. |
| PG → SS: LocInfo, UID, ASID, h(D), TS5, SPG (h(LocInfo, UID, ASID, h(D), TS5)) | PG signs a location certificate, and PG sends it to substation through existing SSL tunnel. Here, SPG denotes asymmetric encryption under PG's secret key. |
| SS → M: LocInfo, UID, ASID, h(D), TS5, TS6, SPG (h(LocInfo, UID, ASID, h(D), TS5)) | Substation forwards location certificate to meter through the power line network. All communications between SS and M are encrypted using the working key. |
| M → HAD: LocInfo, UID, ASID, h(D), TS5, TS7, SPG (h(LocInfo, UID, ASID, h(D), TS5)) | Meter relays a location certificate to HAD. |

In summary, the human authorization detector 410 and the electric meter 305 communicate using, in one embodiment, pre-arranged keys to bootstrap the KMK process. Both the electric meter 305 and the human authorization detector 410 include tamper reporting hardware and are tamper resistant to prevent a third party from simulating a switch pressing activity to mimic the functionality of the human authorization detector 410.

The user's electric meter 305 (M) and substation 220 (SS) authenticate themselves to each other. This is referred to here as the Meter Authentication Protocol (MAP). Mutual authentication between M and SS is accomplished through their mutual knowledge of the secret MSI and SSSI. This ensures that, without knowledge of MSI and SSSI, an adversary cannot forge, modify, or replay messages without detection. One of ordinary skill in the art will appreciate that those protocols, and others mentioned throughout this disclosure, are for example purposes only. Any application-specific, individual protocol could be used, and also could be modified as needed to suit the present invention. Whatever protocol is used, it should not interfere with the last hop in the chain being a side channel, so that the activation of the human authorization detector 410 is detectable in a channel separate from the channel connecting the user's computer and the application server 420.

All elements of PLAP are implemented using standard best practices for cryptographic protocols, including mechanisms to prevent splicing and protocol interaction attacks. Also, all messages between M and SS are encrypted with the working key.

One example protocol for the MAP works in three rounds (though any other protocol requiring stronger mutual authentication could be used instead of this one):

(1) M→SS: Mname, TS1, R1, HMAC(MSI, (Mname, TS1, R1))

(2) SS→M: Mname, TS2, HMAC(SSSI, (Mname, MSI, TS2, R1+1))

(3) M→SS: Mname, Data, TS3, R2, HMAC(MSI, (Mname, Data, TS3, R2)), where Mname is the public electric meter name, TS1, TS2, TS3 are current times, and R1 and R2 are random nonces. 'Data' represents the location certificate request. At each round, the recipient verifies the correct computation of the HMAC'd values, the freshness of the time stamp, and the uniqueness and consistency of the nonce. The HMAC protects the privacy of MSI and SSSI, and it prevents undetected modification of the transmitted values. The HMAC functions like a hash function, but offer greater security against appending data attacks.

The power grid server 415, substation 220, electric meter 305, and human authorization detector 405 are trustworthy, and in particular, they have sufficient physical protection. All of the standard cryptographic functions used are secure, including the hash function, HMAC, and symmetric and asymmetric encryption systems.

Modification of certificates or protocol messages would be detected because of the hash constructions. Timestamps and random nonces protect against replay attacks. In addition, all communications between the electric meter 305 and the substation 220 are encrypted with symmetric encryption.

Signed by the power grid server 415, a Location Certificate (LocCert) is constructed for a particular transaction between the user and the application server 420. The present invention relies upon, in one embodiment, a cryptographic hash function h, a Hashbased Message Authentication Code (HMAC), and an asymmetric cryptosystem. For purposes of illustration, let $P_{PG}$ and $S_{PG}$ denote, respectively, the public and secret keys of the power grid server 415. Lifting this notation, for any string x, let $P_{PG}(x)$ and $S_{PG}(x)$ denote, respectively, the encryption of x under keys PPG and SPG. Thus, the location certificate is given by, $$LocCert=(LocInfo, UID, ASID, h(D), TS,$$

$$S_{PG}(h(LocInfo, UID, ASID, h(D), TS))),$$

where LocInfo is the user location, UID is the user ID; ASID is the ID of application server 420; D is the transaction data (which also contains a unique identifier); and TS is the current time. Known as "limited civic location information," LocInfo is provided by the power grid server 415 for application server 420 (from registration information), after the power grid server 415 verifies that the user's request originated from the user's electric meter 305. In the first line of the construct above, the hash function protects the privacy of D.

3. Second human-in-the-loop authorization using the human authorization detector 410:

Before displaying transaction details, the human authorization detector 410 verifies consistency of h(D) with its buffered data D; the human authorization detector 410 verifies the location certificate using $P_{PG}$; and the human authorization detector 410 verifies the freshness of the time stamps. If verification is successful, the human authorization detector 410 displays D. If user accepts, the human authorization detector 410 forwards the certificate to the user's computer.

4. The user's computer relays location certificate to the application server over Internet:

| | |
|---|---|
| C → AS: LocInfo, UID, ASID, h(D), TS5, $S_{PG}$ (h(LocInfo, UID, ASID, h(D), TS5)) | The user's computer 405 relays the location certificate to the application server 420 through the preestablished secure connection (e.g., SSL tunnel). Upon receipt, the application server 420 verifies the certificate using PPG, the freshness of the timestamp, and all hashed values. |

To verify a location certificate, application server 420 checks the signature and recomputes the hashed values. In addition, application server 420 verifies freshness of the timestamp and the appropriateness of LocInfo for the user. Assuming h is collision resistant, the certificate cannot be modified without detection.

As noted above, the communications between the substation 220 and the power grid server 415, and between application server 420 and the user's computer 405 are protected by SSL or any other standard mechanism. The user must manually authorize all certificate requests and deliveries via the human authorization detector 410, which displays associated transaction and certificate data. The adversary cannot forge certificates, nor impersonate the electric meter 305 or the substation 220, without the MSI. The MSI is physically protected on the electric meter 305, and it never appears as plaintext in any message. Whenever it does appear, it is hashed together with a random nonce and timestamp. The substation 220 and the power grid server 415 may impersonate the electric meters 305. This limitation could be avoided with more powerful electric meters 305 capable of asymmetric encryption.

Privacy of transaction details D are hidden from the electric meters 305, the substation 220, and the power grid server 415 because the location certificate includes the hash of D rather than D. This can be a flexible policy-driven system in which it is possible to release various forms of location information to the application server 420, depending in part on the type of transaction. The initial information is collected, and the policies are established, at registration. The LocInfo in the certificate might be a hash of plaintext location information.

Targets for hackers may include the power grid server 415, the substation 220, the electric meter 305, and user's computer 405. In particular, the security of the system depends critically on the secrecy of the MSI, which is known by the electric meter 305, the substation 220, and the power grid server 415.

Other essential attributes of the architecture of the present invention include at least the following:

(1) Active monitoring/policing of the last-hop-loop and strict enforcement of bandwidth and data transmission quotas and other rules of "behavior" to prevent this network from getting clogged quickly with "junk" messages and entities that plague the Internet today.

(2) Incorporate security primitives (i.e., the devices using the system of the present invention will be supported by a variety of encryption/decryption algorithms, digital signaturing, one-way function-generation/hashing algorithms, etc.)

Note that the physical path(s) at the back end that connect the distribution system 205 to the rest of the electric grid accessible data/security services may be arbitrary, as long as (i) the substation 220 can identify the individual electric meters 305 uniquely and (ii) strong end-to-end encryption is used. In principle, the utility company, or a third party could pick up the data at each substation 220, properly format and encrypt it, and then send it on to destinations through any network including the Internet.

Figure 9:
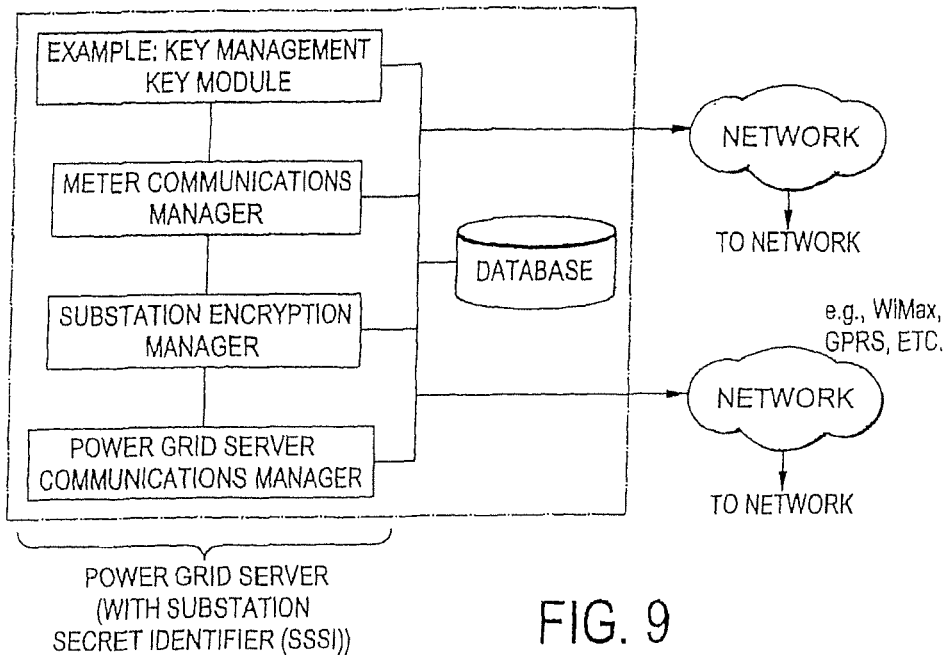
FIG. 9 is block diagram of a substation according to one aspect of the present invention.

Before turning to specific examples of the use of the present invention, additional information about the substation 220 is now provided. Turning to FIG. 9, shown therein is a block diagram of certain features of the substation 220 according to one embodiment of the present invention. These include a Key Management Key (KMK) module 905 (although any other protocol could be used), which provides or stores the long term Key Management Keys for that particular substation 220. The meter communications manager 910 manages all of the meters 305 that are associated with a particular substation 220, including storing electronic records information on one or more databases 935 (which may also be connected to the other modules and managers). The substation meter communications manager 910 may communicate with each of the electric meters 305 by way of the electric grid or a second network 925. The substation encryption manager 915 handles various activities related to encryption, including, as noted above, the specific public/private key pair for the power grid server 415 at the substation 220, managed by a, for example, Public Key Infrastructure (PM). The power grid server communications manager 920 handles processing data between the substation 220, the power grid server 415 at that substation 220, and may be communicated via separate network 930 (which may be the same as the network 925), using WiMax, GPRS, etc. The substation is defined by a Substation Secret Identifier (SSSI), which is used for the MAP.

As discussed previously, both the human authorization detector 410 and the electric meter 305 have a backup power supply. Similarly, the features of the substation 220 described above may each have a backup power supply (or a single backup power supply may be used to provide power to all of the features of the substation 220). Thus, even if the structure 105 has no power (say because an ice storm knocked down some power lines, a surge protector stops current from flowing, a transformer goes bad, etc.) both components will still operate. That is, messages could still be sent by the system as long as the electric conductors themselves are not physically broken, which is a relatively rare event. The conducting wires used by the present invention are independent of whether or not they are simultaneously carrying electric current at the same time (i.e. delivering electric power to the end-user is always "on," so as long as the last hop or link is not physically severed, the present system is able to send out a signal, but only as long as the devices at either end of the last hop have battery backup).

Specific examples of the use of the invention are now described. Specific examples of the invention were tested. The first involved using the HomePlug power line adapter and software simulations for the electric meter 305, the human authorization detector 410, the substation 220, and the power grid server 415. In one application, a banking customer negotiates and tests authentication policies with a simulated bank, such as requiring power line authentication from home for any remote transaction over a specified dollar limit. In another application of the invention, access to a simulated SCADA system required location authentication from within an authorized area. In both examples, the software of the present invention used the SHA-256, RSA-2048, and AES-128 cryptographic algorithms, and an X.509-style format for the location certificates, as supported by the Bouncy Castle cryptographic package. In scale-up, it is estimated that implementation of the present invention would require network bandwidth of about 0.35 Mbps, which is practical for power line communications.

Example 1

Banking Transactions

The invention is described as being useful to enforce location-based access to sensitive banking transactions. Suppose, for transaction safety purposes, a user would like to put the following restriction on access to their bank account: any transaction that debits more than a threshold amount (say $100,000) must be done only from their home or other pre-approved secure location. With the electric grid communications available as a side-channel, this can be accomplished as described above. In particular, to enforce such a policy, whenever the user requests a sensitive/critical transaction, the bank (the application running at the bank on an application server 420) asks the user to "prove" that they are currently at a prior-designated/authorized safe location. A few key assertions are applicable here: the user is at the secure location (i.e., their home), they must demonstrate the following two things: (1) that the client application running on the user's computer 405 is running on a computer which is physically connected to the electric meter 305 at the safe/secure location, and (2) the user must also be able to prove that they themselves are requesting that transaction, i.e., also pass the so called "human-in-the-loop" test. The steps of the banking transaction protocol are as follows:

Step 1: the bank creates an encrypted payload, D1, consisting of the following parameters, (i) Application ID (ii) User ID (iii) Session ID (iv) Timestamp (v) expiry-time and (vi) a random nonce value say N (more parameters could be easily added if and when required). The payload is first encrypted with the private-key of the challenge-issuer (bank-application) and then with public key of a Powerline-Location-Binding-and-Certification (PLBC) server (which may be, in the description above, the power grid server 415). This payload constitutes the "challenge" sent to the user by the bank.

Step 2: the user physically pushes a switch (i.e., a physical or simulated button on the human authorization detector 410) that enables the challenge token from the bank to be transmitted via the HomePlug-LAN and the electric meter 305 to the PLBC server. A third party company (i.e., the PLBC service provider) or the utility company itself will run this server application at each substation 220. The key is that this application can be accessed only from a physical electric meter 305 in the local loop.

Step 3: The PLBC service provider knows the ID of the electric meter 305 through which the request for a location certificate came. It decrypts the payload sent by the challenge-issuer (which in this example is the bank). Note that the outer encryption can only be stripped by the PLBC server because it was encrypted with the PLBC's public key and only the PLBC server knows the corresponding private key. To strip the inner encryption, the PLBC server uses the (well-known) public-key of the application server of the bank. This way the PLBC server is assured that it is indeed looking at the challenge issued by the bank and not at some forged document that a malicious user could inject. Based on the actual identity of the electric meter 305 that relayed the "challenge" (and possibly some other parameters), the PLBC server generates a virtual Meter-ID. It is important to note that if higher privacy/anonymity is desired, the virtual Meter-ID could be part of a long ID-chain so that in each response the Virtual-ID is different (like a one-time password scheme). The real ID of the electric meter 305 is never revealed to anyone. The PLBC server also performs a pre-specified operation on the random nonce N (such as add 1 to it and/or rotate it by specified amounts, etc.) to generate the answer-nonce-value N'. The PLBC server then prepares a response payload that contains N' as well as the Virtual Meter-ID. This payload is also encrypted twice: first with the private key of the PLBC server and then with the public key of the challenge-issuer (i.e., the bank application).

Step 4: This message constitutes the response to the challenge, i.e., the "certificate" sent to the challenge issuer (bank). It is relayed back to the bank via the electric grid, electric meter 305, and the user's computer 405. The bank can now decrypt the payload and verify that the (virtual) electric meter 305 ID matches the one in it's database. Matching the nonce value N' with the expected return value mitigates replay/forgery attacks.

Example 2

Device Tracking Using Power Line Anti-Theft Mechanism (PATM)

Figure 10:
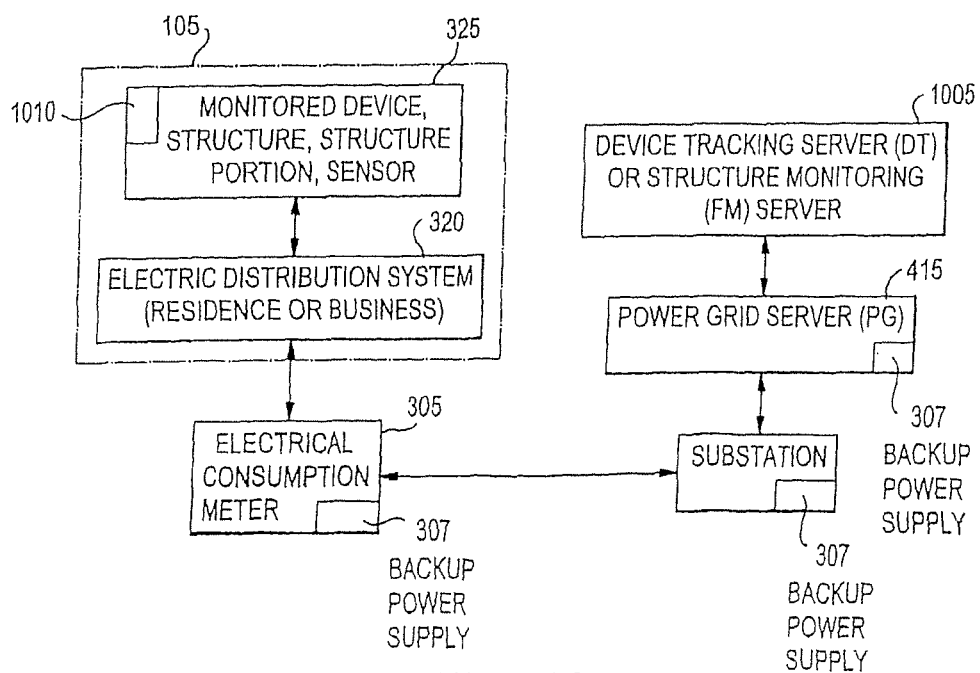
FIG. 10 is a block diagram of a entity tracking or structure monitoring system according to two more aspects of the present invention.

In this example, the invention is described as being useful in tracking electronic devices that require power, including, but not limited to, laptops, PDA's, mobile phones, electric transportation vehicles, etc. In this method of the invention, a mobile electronic device (in this example a consumer electronic device 325, e.g., a user's mobile computer) periodically reports its identity to the power grid server 415 through the hierarchical power line network consisting of the electric meter 305 and substation 220, while the device undergoes charging. The power grid server 415 finds the location of the electronic (mobile) device 325 based on a reported identity of the electric meter 305. The power grid server 415 creates and signs the location certificate (LocCert) containing a current location of the device and the device identity, and sends that information to a device tracking server (DT) 1005 (FIG. 10).

The device tracking server 1005 is deliberately kept separate from the power grid server 415. One embodiment of the invention is a scenario wherein each manufacturer/vendor of a valuable devices runs a tracking server for the devices they manufacture (for example, Apple would operate a tracking server for notebooks or smart phones that it sells; General Motors would run a tracking server for the electric cars it manufactures and sells, etc.). The manufacturer/vendor would pay an amount of money to the power company for providing the tracking information in accordance with the procedures described in this example and in the application generally. Of course, the manufacturer/vendor could in turn pass on part of the cost of continuous tracking to the customers/owners of the devices/vehicles they purchased and wish to have tracked.

Based on the current status of the mobile device and pre-configured policies, the device tracking server 1005 sends a notification to the mobile device via the power grid server 415 through the power line network. Upon receipt of the notification message, the electronic (mobile) device 325 takes appropriate actions.

The use of power line communications is a good choice for this anti-theft mechanism. The power line network described above provides fine-grain location information which can be used to discover the current location of a stolen device. The power line network is highly reliable and widely available.

Existing anti-theft mechanisms preserve confidentiality of stored data. But, they do not provide a foolproof way of locating stolen devices. For example's, Intel's anti-theft hardware approach uses the Internet for finding out the location of a stolen device. Communication media like the Internet and WiFi do not provide fine-grain location information. There are various tools like anonymous proxy, and Tor to hide the IP address of the mobile device. Although GPS provides correct location, GPS-based communication support is not available in all types of mobile devices like laptops. Moreover, the GPS network is not available deep inside the building, or even outside tall buildings (because the building structure itself could obstruct the path between the GPS-enabled device and the satellite(s) from which it derives location-specific telemetry data. The anti-theft mechanism disclosed here augments Intel's anti-theft hardware approach for finding the location of a stolen device. In the present invention, the confidentiality of stored data may be achieved by Intel's DAR technology and a foolproof way of locating a stolen device is achieved using the power line communication channel of the present invention.

Turning to FIG. 10, shown therein is a block diagram of the overall architecture and hardware of one embodiment of the anti-theft system of the present invention. The network architecture is similar to the PLAP architecture. Here, the power grid server 415 is a trusted party that controls the anti-theft subsystem, and the application server 420 is a device tracking server 1005, which provides the anti-theft mechanism of the invention as a service. Each device tracking server 1005 may or may not have a unique identifier Device Tracking Server Identifier (DTID) from the power grid server 415 during registration. The electronic (mobile) device 325 may have a unique public device name (DevName) and a private Device Secrete Identifier (DSI). Tamper-resistant hardware, such as TPM protects the DSI. A user can trace a location of a stolen electronic device 325 using the device tracking server 1005, which may be any service provider, such as an electric utility or telephony service provider. It is assumed that the electronic (mobile) device 325 will have inbuilt hardware for power line communication. The electronic (mobile) device 325 can also use a unique power line communications power adaptor 1010, which enables the power line communication while the electronic (mobile) device 325 undergoes charging. The power adaptor 1010 communicates with the power grid server 415

As shown in FIG. 10, the Power Line Anti-Theft Mechanism (PATM) involves an electronic (mobile) device 325 (though the device does not have to be mobile or even portable) that periodically sends a device identification request to the device tracking server 1005 through the power line network via the power grid server 415 (and substation 220). Before forwarding a device identification request to the power grid server 415, the electric meter 305 executes the MAP protocol with the substation 220. For every device identification request, the power grid server 415 signs a location certificate which contains the current location of the electronic (mobile) device 325, the device identifier (DevID), the device tracking server identifier (DTID), and a current timestamp. The device tracking server 1005 keeps track of the location certificates for registered devices. Based on a current status of the electronic (mobile) device 325 and preconfigured anti-theft policies, the device tracking server 1005 decides a appropriate action and sends that action to the electronic (mobile) device 325 through the power line communication protocol.

Various anti-theft policies can be built around the PATM. For example, one policy is to force mobile devices to communicate with the device tracking server 1005 when it undergoes charging. This enables the device tracking server 1005 to send a disable command to the mobile device, if it is stolen. However, a thief can bypass such a policy by running a mobile device on batteries or blocking power line communication protocol communication signals. To get around this problem, the present system requires periodic communication between registered mobile devices and the device tracking server 1005. Thus, the mobile device will block access by a user when it is unable to communicate with the device tracking server 1005 within a certain time period. To avoid a denial of service, the mobile device could ask for a hardware-based password to allow access. Such a hardware-based password mechanism could be, for example, based on Intel's anti-theft approach.

In the PATM protocol, the electronic (mobile) device 325 periodically provides its identity to the power grid server 415 through the hierarchical power line network. The power grid server 415 creates and signs the location certificate containing current location of the electronic (mobile) device 325 and the device's identity, and sends the same to the device tracking server 1005. Based on the current status of the electronic (mobile) device 325 and preconfigured policies, the device tracking server 1005 sends the notification to the electronic (mobile) device 325 via the power grid server 415 through the power line network.

In the description above, the PATM and its protocol would be useful in a hot spot scenario where, for example, a relatively large number of electronic (mobile) devices 325 are all connected to an electrical distribution system within a structure at about the same time. The PATM could, if necessary, batch all the location certificate requests, all of the location certificates received, and send or pass the same according to a specific rule-based protocol (e.g., first on, last on, importance of the communication, transaction type, transaction amount, time of day, electronic (mobile) device type, device ID, etc.). Such a hot spot could be formed, for example, at a conference when during a break several dozen of the conference attendees all connect their laptops to the electrical power grid at the same or approximately the same time.

The PATM protocol involves the following (which is for example only, as other suitable protocols could also be used):

1. The electronic (mobile) device 325 ("Dev") sends a device identification request (DevIDReq) to the electric meter 305 ("M").

| | |
|---|---|
| Dev → M: DevIDReq | The device identification request is given by: DevIDReq =DevName, SID, DTID, TS1, R1, HMAC(DSI, (DevName, SID, DTID, TS1, R1)) SID is a session identifier. |

2. The electric meter 305 sends the request to the power grid server 415 ("PG").

| | |
|---|---|
| M → PG: Mname, DevIDReq, TS2, R2, HMAC(MSI, (Mname, DevIDReq, TS2, R2)) | Initially, electric meter and substation executes MAP for mutual authentication. On successful execution of MAP, the electric meter 305 forwards the DevIDReq to the power grid server 415 through the substation 220. |

3. The power grid server 415 sends the location certificate to the device tracking server 1005.

| | |
|---|---|
| PG → DT: LocInfo, DevIDReq, TS3, SPG(h(LocInfo, DevIDReq, TS3)) | The power grid server 415 verifies HMAC and finds out the current location of the electronic (mobile) device 325 using MSI. The power grid server 415 signs a location certificate consisting of LocInfo, DevIDReq, and TS3. The power grid server 415 sends the signed location certificate to the device tracking server 1005 through a secure channel, such as an SSL tunnel. |

4. The device tracking server 1005 processes the device identification request. That is, the device tracking server 1005 verifies the DevIDReq and the location certificate. It then decides an appropriate control command based on the current status of the electronic (mobile) device 325 (i.e., stolen/not stolen) and using a preconfigured anti-theft policy.

5. The device tracking server 1005 sends a response to the power grid server 415.

| | |
|---|---|
| DT → PG: DevIDResp<br>DevIDResp = Action,<br>SID, TS4, R4,<br>SDT(h(Action,<br>SID, TS4, R4)) | The device tracking server 1005 signs the certificate consisting of the SID, action, TS4, and R4. The action is given by:<br>Action = DevName, DTID, Control-Command, HMAC(DSI, (DevName, DTID, Control-Command, TS4, R4)) |

6. The power grid server 415 sends the response to the electric meter 305.

| | |
|---|---|
| PG → M: DevIDResp | PG forwards device identification response to electric meter via the substation 220. |

7. The electric meter 305 receives the device identification response to the electronic (mobile) device 325 while it is connected to the electrical grid.

| | |
|---|---|
| M → Dev: DevIDResp | The electric meter 305 sends the device identification response to the electronic (mobile) device 325. |

The electric meter 305 forwards the device identification response to the electronic (mobile) device 325. The electronic (mobile) device 325 verifies the device tracking server signature, HMAC in action, freshness of the timestamp and the consistency of the nonce. The electronic (mobile) device 325 then takes action specified by the device tracking server 1005, which could, for example, be an action to block any access to the electronic (mobile) device 325 and the data stored therein.

Example 3

Emergency Signaling

In this example, the invention is described as being useful for emergency signaling. Residential and business alarm monitoring services provided to residences and businesses, typically utilize land lines and/or wireless signals to communicate to a monitoring facility the status of contact, pressure, and infrared sensors, the status of controller boards, and the presence of alarm conditions, etc. Such systems would be more reliable by also communicating via power lines. Thus, in an emergency, a critical message could be sent via as many channels as possible, not just a single line, which could be compromised by cutting lines and jamming cellular signals.

In current state-of-the-art, power line communication is bidirectional. By exploiting the use of two-way power line communications, a smart grid can be used as a platform for advanced services like power monitoring and emergency signaling. Home monitoring, fire monitoring, and power monitoring systems can be enhanced by sending emergency signal(s) through not only telephone lines, and the Internet, but also through the power line communications channel of the present invention. By sending a critical emergency message through as many channels as possible, the reliability of prior art systems and the safety of a home are enhanced. Or, the monitoring signal may be sent solely over the power line communications channel without also sending a signal over a telephone lines.

FIG. 10 is a block diagram of an architecture and hardware system according to one embodiment of the emergency signaling system of the present invention. Thus, the architecture is similar to the PLAP and PATM architecture. Here, the power grid server 415 is a trusted party that controls the anti-theft subsystem, and the application server 420 is now a structure monitoring server 1005. The structure being monitored includes a plurality of transducers for outputting a signal corresponding to the status of the transducer (i.e., an open circuit status when a window or door electrical contact is in an open state, a smoke concentration exceeding a threshold value, a moisture sensor submerged under water, etc.). The power grid server 415 then sends location information of the structure to emergency services when emergency services are needed. Thus the present invention may also be used to find the location of the structure (e.g., residence or business). Because many electronic devices require accurate time (e.g., home medication dispensing devices), the present embodiment can also be used to send a signal to the structure's electronic devices to reset all the clocks on those electronic devices, which would be done, for example, after a power loss to the facility, or on a regular, pre-determined frequency.

Example 4

Securing Control-Planes of Real-Time Systems

In this example, the invention is described as being useful for securing communications sent to sensitive and other control systems. The phrase "control-plane" is often used to refer to the collection of entities that control distributed systems. For instance, the routers, DNS servers, etc., form the control-plane of the Internet. The phrase "real-time systems" refers to the entities that control the electrical grid, (natural) gas distribution network, water supply network, etc. The critical commands to initiate high-impact actions (such as open/close flood gates of a dam or a valve in a high-pressure gas pipeline, etc.) must be run only from pre-authorized and secure locations. The system, method and apparata of the present invention described above may be used to provide safeguards against subversion of critical infrastructures from remote sites (for example, making it substantially harder for an adversary to bring-down an electrical grid by remotely hacking into the control plane).

Thus, in the case, for example, of an facility control room operator in charge of a sensitive, computer-controlled unit operation, the computer will seek authorization from the operator prior to executing an instruction that would alter the operation from its existing state to a different state (i.e., open a control valve). In this scenario, the computer controlling the unit operation would be a user computer 405, as shown in FIG. 6. The operator's station would be proximate to a human authorization detector 410, which is available for the operator to activate upon a request generated by the operator's computer for a location certificate. That request would be passed by the human authorization detector 410 to a side-channel network consisting of one of the facilities' electric meters 305 dedicated to handling such requests, and a power grid server 415, both of which are connected to a substation 220 that provides electric service to the facility. In this way, only the operator of the sensitive unit operation who is physically located at the facility will be able to cause the computer to execute the instruction that alters the operation.

Although a physical position of a control valve is used in the example above, one of ordinary skill in the art will appreciate that the invention could be used for controlling a change in any physical, chemical, electronic, acoustic, and magnetic state of a device or process. These would also include, for example, any photonic/optical, thermodynamic/energy/entropy state, location, position, angle, temperature, rate, linear or angular velocity, acceleration or pressure state of a device.

Example 5

Device Chain of Custody/Voting Machine

In this example, the invention is described as being useful for chain of custody assurance. The primitives described above could be used to verify that an electronic voting machine used in an election is not turned on anywhere except in the precinct where it is supposed to be deployed, and further, that it is only turned on at times consistent with the election date and times.

Example 6

Accessing Sensitive Information

Institutions or federal agencies, such as the Department of Defense, may require a location certificate before allowing access to sensitive information. For example, upon receiving a request to access documents containing the design details of a next generation fighter, the Document Server (i.e., an application server) could demand a location certificate from the power grid server, proving that the request originated from a computer physically connected to an electric meter located at a known location (i.e., within the Pentagon campus). If a valid certificate cannot be produced, then access to the design documents (or objects, data, things, etc.) is denied and logged for forensic analysis. Such a strong location-binding access control can prevent unauthorized downloads.

Another use of the invention is for reliable custody of data. It is likely that the aforementioned institutions or federal agencies (but also private companies, smaller entities, as well as individuals) could allow their sensitive data (for example, designs of nuclear weapons) to be archived/managed by a data-center operator (e.g., email storage on Hotmail™, Yahoo™, and Google™). The DoD, for example, might want a guarantee that the data being archived on its behalf by a service provider such as IBM, Google, Microsoft, Oracle, etc. is physically residing on storage devices in the United States and has not been subcontracted and archived offshore (to, for example, countries with less reliably secure systems) just to cut costs or other reasons. In such cases, the strong location-binding certificates described in this invention can be used to guarantee that the chain of custody is still confined to safe locations (such as the continental United States or other countries). Private companies can also safeguard their intellectual property data using similar reliable chains of custody.

If not already defined above, the following are acronyms that may be used in describing some of the protocols, systems, methods, and apparata of the present invention:
AMR=Automatic Meter Reading
AS=Application Server (i.e., application server 420)
ASID=Application Server Identifier
C=User's Computer (i.e., user's computer 405)
D=Transaction Details
Dev=Mobile Device (i.e., electronic (mobile) device 325)
DevName=Device name
DSI=Device Secret Identifier
DT=Device Tracking Server (i.e., device tracking server 1005)
DTID=Device Tracking Server Identifier
GPS=Global Positioning System
HAD=Human Authorization Detector (i.e., human authorization detector 410)
HMAC=Hash-based Message Authentication Code
IP=Internet Protocol
M=Electric Meter (i.e., electric meter 305)
MAP=Meter Authentication Protocol
MitM=Man-in-the-Middle
Mname=Meter Name
MSI=Meter Secret Identifier
PG=Power Grid Server (i.e., power grid server 415)
PLAP=Power line Location Authentication Protocol
SCADA=Supervisory Control And Data Acquisition
SS=Substation (i.e., substation 220)
SSL=Secure Sockets Layer
SSSI=Substation Secret Identifier
TS=Time Stamp
UID=User Identifier The term "channel" used herein generally refers to a connection between two or more electronic devices. Without limitation, the term "channel" could refer to, for example, the network link between a user's computer and a server. The terms "side channel," "second channel," "out-of-band" channel and the like used herein generally refer to a connection between two or more devices that is distinct from any other connection between the same two or more devices. Thus, by way of non-limiting example, a single device may send an electric signal over a first channel, and also send the same or a different electric signal over a different "side channel." The term "side" or "second" or "out-of band" do not necessarily denote the hierarchy of the channels. That is, the "side channel" may be the primary channel used by the device to send signals. The terms "sending," "distributing," "outputting," "transmitting," and the like used herein generally refer to an electronic signal being sent from one electronic device to another electronic device.

Although certain presently preferred embodiments of the disclosed invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

I claim:

1. A method for tracking the location of any device that runs on electricity; comprising the steps of:
   whenever the device is powered ON, automatically generating and sending a message to a Location Tracking Server (LTS), via the electric power plug, to the power meter that monitors the electricity usage from the plug to which the device is connected; The message including timestamps, device identifiers, tracking server identifiers and cryptographic authentication challenge/nonce values;
   the power meter appending its own location identifiers along with all the necessary cryptographic authentication tokens, timestamps, state-indicators to the message and sending the combined message over an out-of-band communication channel that spans at least a portion of the electric grid which is connected to the said electric power meter on the upstream side; to a Location Tracking Server;

at the Location Tracking Server, verifying all the timestamps and cryptographic tokens and determining whether the location reported by the meter is a pre-designated safe location where the device normally operates or whether the device is at an unexpected location and potentially stolen;

the Location Tracking Server preparing a reply message (referred to as a "blessing") including a recommendation or directive to the device being tracked, indicating what level of functionality the device should operate in; along with cryptographic tokens, nonces and timestamps;

the Location Tracking Server sending its blessing back in the reverse direction over the forward path including the at least some portion of the electric grid connected to the electric power meter on the upstream side;

the electric power meter relaying the message to the device being tracked via the power plug;

the device being tracked receiving the blessing message, decrypting it if required and verifying the cryptographic credentials and/or responses from the Location Tracking Server and learning the state it is expected to go into, and entering that state.

2. The method of claim 1, wherein the state can be anything from "safe location, provide full functionality, you are blessed to run freely" on one extreme, to "wipe out all non-volatile storage, including discs or semiconductor memories, RAM, all bios values/keys if any and shut yourself down" on the extreme; depending upon whether the device is at its usual location or it is stolen and is therefore at a strange location; and upon the sensitivity/importance of data if any that resides on that device.

3. The method of claim 1, wherein each individual message sent includes new cryptographic challenges and responses to previous cryptographic challenges from the peer.

4. The method of claim 1, wherein the device being tracked optionally sends an acknowledgement informing the LTS that it is entering the state indicated in the blessing message before entering that state.

5. The method of claim 1, wherein the device being tracked enters a pre-designated safe state if it cannot communicate with the LTS via the electric plug for a duration exceeding a timeout-interval.

6. The method of claim 1, wherein, the attempt to communicate with a Location Tracking Server is made optionally at every $2^{nd}$ or $3^{rd}$ or $n^{th}$ powering-ONN or in general every $k^{th}$ time the device is powered-ONN, where "k" is dynamically determined via some algorithm.

7. The method of claim 1, wherein the electronic device is or is not part of a computer.

8. The method of claim 1, wherein the device is part of an electric vehicle or car and is used to identify and track the location of the vehicle.

9. The method of claim 1, wherein the device optionally sends an alarm signal after it is connected to an unauthorized portion of the electric grid.

10. The method of claim 1 further comprising:
optional execution of more authentication and/or theft identification and reporting procedures if the LTS does not get a message from the device being tracked for a time period exceeding a dynamically adaptable timeout-threshold interval.

11. The method of claim 1, applied to tracking the location where licensed software is run and verifying compliance with DRM (Digital Rights Management) and license controls.

12. The method of claim 1, wherein the device is a part of Voting Machines and is used to verify compliance with all election rules and procedures.

13. The method of claim 1, wherein the device is installed within shipping containers and is used to enforce "verifiable custody chains".

14. A system for tracking the location of any device that runs on electricity; comprising:
a Location Tracking Server (LTS);
a power meter;
a device that runs on electricity configured so that whenever the device is powered ON, the device automatically generates and sends a message to the Location Tracking Server (LTS), via an electric power plug, to the power meter that monitors the electricity usage from the plug to which the device is connected; the message including timestamps, device identifiers, tracking server identifiers and cryptographic authentication challenge/nonce values;
wherein the power meter is configured to append its own location identifiers along with all the necessary cryptographic authentication tokens, timestamps, state-indicators to the message and sends the combined message over an out-of-band communication channel that spans at least a portion of the electric grid which is connected to the power meter on the upstream side; to the Location Tracking Server;
wherein the Location Tracking Server is configured to perform steps including
at the Location Tracking Server, verifying all the timestamps and cryptographic tokens and determining whether the location reported by the power meter is a pre-designated safe location where the device normally operates or whether the device is at an unexpected location and potentially stolen;
preparing a reply message (referred to as a "blessing") including a recommendation or directive to the device being tracked, indicating what level of functionality the device should operate in; along with cryptographic tokens, nonces and timestamps;
sending its blessing back in the reverse direction over the forward path including the at least some portion of the electric grid connected to the power meter on the upstream side;
wherein the power meter is configured to relay the blessing to the device being tracked via the power plug; and
wherein the device being tracked is configured to receive the blessing, decrypting it if required and verifying the cryptographic credentials and/or responses from the Location Tracking Server and learning the state it is expected to go into, and enter that state.

15. The system of claim 14, wherein the state can be anything from "safe location, provide full functionality, you are blessed to run freely" on one extreme, to "wipe out all non-volatile storage, including discs or semiconductor memories, RAM, all bios values/keys if any and shut yourself down" on the other extreme; depending upon whether the device is at its usual location or it is stolen and is therefore at a strange location; and upon the sensitivity/importance of data if any that resides on that device.

16. The system of claim 14, wherein each individual message sent includes new cryptographic challenges and responses to previous cryptographic challenges from the peer.

17. The system of claim 14, wherein the device being tracked optionally sends an acknowledgement informing the LTS that it is entering the state indicated in the blessing before entering that state.

18. The system of claim 14, wherein the device being tracked enters a pre-designated safe state if it cannot communicate with the LTS via the electric plug for a duration exceeding a timeout-interval.

19. The system of claim 14, wherein, the attempt to communicate with a Location Tracking Server is made optionally at every 2nd or 3rd or nth powering-ONN or in general every kth time the device is powered-ONN, where "k" is dynamically determined via some algorithm.

20. The system of claim 14, wherein the device is or is not part of a computer.

21. The system of claim 14, wherein the device is part of an electric vehicle or car and is used to identify and track the location of the electric vehicle or car.

22. The system of claim 14, wherein the device optionally sends an alarm signal after it is connected to an unauthorized portion of the electric grid.

23. The system of claim 14, further comprising:
optional sub-systems that perform more authentication checks and/or theft identification and reporting if the LTS does not get a message from the device being tracked for a time period exceeding a dynamically adaptable timeout-threshold interval.

24. The system of claim 14, applied to tracking the location where licensed software is run and verifying compliance with DRM (Digital Rights Management) and license controls.

25. The system of claim 14, wherein the device is a part of Voting Machines and is used to verify compliance with all election rules and procedures.

26. The system of claim 14, wherein the device is installed within shipping containers and is used to enforce "verifiable custody chains".

* * * * *